United States Patent
Goede et al.

(10) Patent No.: US 12,191,092 B2
(45) Date of Patent: Jan. 7, 2025

(54) CONTACTOR DEVICE AND ENERGY STORAGE SYSTEM

(71) Applicant: MUNICH ELECTRIFICATION GMBH, Munich (DE)

(72) Inventors: Stefan Goede, Munich (DE); Philipp Lachner, Munich (DE); Sebastian Kleppe, Munich (DE); Heiko Bergmaier, Munich (DE); Tobias Werling, Munich (DE)

(73) Assignee: Munich Electrification GmbH, Munich (DE)

( * ) Notice: Subject to any disclaimer, the term of this patent is extended or adjusted under 35 U.S.C. 154(b) by 0 days.

(21) Appl. No.: 18/696,843

(22) PCT Filed: Jun. 1, 2023

(86) PCT No.: PCT/EP2023/064659
§ 371 (c)(1),
(2) Date: Mar. 28, 2024

(87) PCT Pub. No.: WO2023/232930
PCT Pub. Date: Dec. 7, 2023

(65) Prior Publication Data
US 2024/0274375 A1 Aug. 15, 2024

(30) Foreign Application Priority Data
Jun. 2, 2022 (EP) ..................................... 22177000

(51) Int. Cl.
*H01H 1/20* (2006.01)
*H01H 39/00* (2006.01)
(Continued)

(52) U.S. Cl.
CPC ........ *H01H 1/2025* (2013.01); *H01H 39/006* (2013.01); *H02J 7/0024* (2013.01); *H01H 2039/008* (2013.01); *H01H 50/546* (2013.01)

(58) Field of Classification Search
CPC .. H01H 1/2025; H01H 39/006; H01H 50/546; H01H 2039/008; H02J 7/0024
(Continued)

(56) References Cited

U.S. PATENT DOCUMENTS 3,718,848 A * 2/1973 Hines ..................... H02J 7/0024
  320/117
8,400,012 B2 * 3/2013 Weidenheimer .......... F41B 6/00
  307/9.1
(Continued)

FOREIGN PATENT DOCUMENTS

CN 103887859 B 3/2016
CN 112927958 A 6/2021
(Continued)

OTHER PUBLICATIONS

European Patent Office Extended European Search Report for Application No. 22177000.1 dated Dec. 18, 2022 (5 pages).
(Continued)

*Primary Examiner* — Richard V Muralidar
(74) *Attorney, Agent, or Firm* — Michael, Best & Friedrich LLP

(57) ABSTRACT

The present invention relates to a contactor device (100), which is capable of changing a connection state of at least two battery modules (502(1), 502(2)) of a high voltage energy storage system (10) between a series connection and a parallel connection, and to an energy storage system (10) comprising the contactor device (100). The contactor device (100) comprises two first terminals (102, 104) for electri-
(Continued)

cally connecting at least one of a load and a charger, two second terminals (106, 108) for electrically connecting a first battery module (502(1)), and two third terminals (110, 112) for electrically connecting a second battery module (502(2)). The contactor device (100) further comprises two first bus bars (128, 129), which each are electrically connected to one of the first terminals (102, 104), and two second bus bars (138, 139; 238, 239), wherein one of the second bus bars (138; 238) is electrically connected to one of the second terminals (106), and the other one of the second bus bars (139; 239) is electrically connected to one of the third terminals (112), and a connection bus bar (144), which is electrically isolated from the two first bus bars (128, 129). At least one actuation element is configured to change a state of the contactor device (100) at least to and from a series connection state, in which the two second bus bars (138, 139; 238, 239) are conductively coupled to the connection bus bar (144), and to and from a parallel connection state, in which one of the second bus bars (138; 238) is conductively coupled to one of the first bus bars (128) and the other one of the second bus bars (139; 239) is conductively coupled to the other one of the first bus bars (129).

15 Claims, 14 Drawing Sheets

(51) Int. Cl.
*H02J 7/00* (2006.01)
*H01H 50/54* (2006.01)

(58) Field of Classification Search
USPC .................. 320/117; 307/112; 361/634–636, 361/648–650, 637–639, 652–656
See application file for complete search history.

(56) References Cited

U.S. PATENT DOCUMENTS

| | | | |
|---|---|---|---|
| 11,708,008 B2* | 7/2023 | Heydel | H02J 7/0019 318/139 |
| 2015/0214532 A1* | 7/2015 | Nakayama | H01M 50/509 429/50 |
| 2024/0203676 A1* | 6/2024 | Schoot Uiterkamp | H01H 50/541 |

FOREIGN PATENT DOCUMENTS

| | | |
|---|---|---|
| DE | 102021104142 A1 | 8/2022 |
| EP | 3933878 A1 | 1/2022 |
| GB | 2606347 A | 11/2022 |
| KR | 20080043481 A | 5/2008 |

OTHER PUBLICATIONS

International Search Report for Application No. PCT/EP2023/064659 dated Sep. 5, 2023 (2 pages).

\* cited by examiner

CONTACTOR DEVICE AND ENERGY STORAGE SYSTEM

CROSS-REFERENCE TO RELATED APPLICATIONS

This patent application is the U.S. national stage entry, under 35 U.S.C. § 371, of International Application Number PCT/EP2023/064659, filed Jun. 1, 2023, which claims priority to Great Britain Patent Application No. 22177000.1, filed Jun. 2, 2022, the entire contents of each of which are hereby incorporated by reference.

The present invention relates to a contactor device, which is capable of changing a connection state of at least two battery modules of a high voltage energy storage system between a series connection and a parallel connection, and to an energy storage system comprising the contactor device.

The use of contactor devices for connecting and disconnecting electronic circuits in an energy storage system is known state of the art. With the advanced development of electric vehicles (EV) or hybrid electric vehicles (HEV), high voltage energy storage systems become more and more common in vehicles. As such high voltage systems nowadays are typically capable of supplying voltages in a typical range between 400 V and 1 kV and may be even capable of supplying higher voltages in future applications, these high voltage energy storage systems present a greater shock hazard than traditional powertrains. Accordingly, the prevention of safety hazards and overcurrent protection is of utmost importance for these systems. For example, it is important to ensure the safety of the vehicle's passengers, of roadside assistance or of maintenance workers, in cases of malfunctions of the high voltage energy storage system or of an accident of the vehicle, which affects the electronic circuits of the energy storage system.

Accordingly, the safety requirements for contactor devices used to control current flow in energy storage systems are increasing, especially where energy storage systems are used for storing energy to drive a vehicle.

Conventional contactor devices are capable of reversibly changing a state between a closed state, where current flow through the contactor device is possible and an open state, where current flow through the contactor device is prevented, usually by moving at least one moveable contact. In addition, overcurrent protection devices, like pyro-fuses, may be used, which allow to irreversibly break the voltage supply in the high voltage energy storage system, when they are activated, in case that the operation conditions in the energy storage system becomes unsafe, for example due to overcurrent or malfunctions occurring in the electronic circuits of the energy storage system or in case that a vehicle, which is driven by the energy stored in the energy storage system, has an accident.

However, depending on applications, in which the energy storage system is used, it can be desired to switch the contactor device not only between an open state or a closed state. For example, the contactor device may be electrically connected to a high voltage battery, which is a driving battery for an EV or HEV vehicle. For providing high voltage in the range between 400 V and at least 1 kV to a motor of the EV or HEV vehicle in a driving state, a plurality of batteries modules (or battery packs) are electrically connected to form the high voltage battery, so as to provide a predetermined high voltage as a sum of the module voltages. However, since in this manner the battery voltages can be enhanced more and more, not all chargers or charging stations may be capable of charging such high voltage batteries with the predetermined high voltages, but may only supply voltages, at a voltage level below the predetermined high voltage, so that it is difficult to properly charge the high voltage battery.

Accordingly, it is desirable to switch the battery configuration between a series connection state, which connects the plurality of battery modules in series, so that the high voltage battery can supply the full sum of voltages of the plurality of battery modules, for example in the driving state, and a parallel configuration, which connects at least some of the plurality of battery modules in parallel, which would allow to charge the high voltage battery with a voltage level below the predetermined high voltage.

Accordingly, it is an object of the present invention to provide a contactor device, which provides the possibility for changing the connection state of a high voltage battery. Furthermore, it is an object of the present invention to provide a simple and economic solution.

This object is solved by the subject matter of the independent claims. Advantageous aspects of the present disclosure are the subject matter of the dependent claims.

In particular, the present disclosure provides a contactor device, which comprises two first terminals for electrically connecting at least one of a load and a charger, two second terminals for electrically connecting a first battery module, and two third terminals for electrically connecting a second battery module. The contactor device further comprises two first bus bars, which each are electrically connected to one of the first terminals, two second bus bars, wherein one of the second bus bars is electrically connected to one of the second terminals, and the other one of the second bus bars is electrically connected to one of the third terminals, a connection bus bar, which is electrically isolated from the two first bus bars, and at least one actuation element, which is configured to change a state of the contactor device at least to and from a series connection state, in which the two second bus bars are conductively coupled to the connection bus bar, and to and from a parallel connection state, in which one of the second bus bars is conductively coupled to one of the first bus bars and the other one of the second bus bars is conductively coupled to the other one of the first bus bars.

By providing the second bus bars as a second set of bus bars and the connection bus bar, the contactor device allows to switch a configuration of connected battery modules between a state, in which the terminals of opposite potential of the battery modules are electrically connected in series, since the second set of bus bars is electrically connected to the connection bus bar, and a parallel connection state, in which the terminals of the same potential of the battery modules are electrically connected in parallel, since each of the second bus bars can be electrically connected to a respective one of the first bus bars. Accordingly, the contactor device allows to switch in a simplified manner between the series connection state, in which a full voltage of the battery connected to the contactor device is applied between the two first bus bars of the connector device, and the parallel connection state, in which a voltage corresponding to module voltages of the battery modules, which form the battery is applied between the two first bus bars of the connector device.

In this manner, the contactor device according to the present disclosure allows in the series connection state to supply a predetermined high voltage for example to an electric motor of an electric vehicle, while allowing in the parallel connection state to charge the battery modules of the battery at a voltage level, which is below the predetermined high voltage. Hereby, due to its simple configuration, the contactor device of the present disclosure allows to dispense the need for providing a complicated switching structure between the battery modules in order to change between a series connection and a parallel connection of the battery modules.

According to an advantageous example, each of the second bus bars comprises a deflectable contact region, which is capable of elastically deflecting between a first position, in which each of the second bus bars is conductively coupled to the connection bus bar and a second position, in which each of the second bus bars is conductively coupled to one of the first bus bars. In this manner a transition force provided by the at least one actuation element for changing the state of the contactor device can be transmitted effectively, since it is not necessary to move the second bus bars as a whole. However, as in an alternative example, the second bus bars may be moved as a whole between the first position and the second position.

In another advantageous example, the contactor device may further comprise two secondary connection bus bars, which each are configured to conductively couple one of the second bus bars to respectively one of the first bus bars in the parallel connection state of the contactor device. In this manner, the contactor device may comprise only fixed bus bars, which allow to change the state of the contactor device between the series connection state and the parallel connection state.

In order to allow effective force transmission when changing the state of the contactor device, the connection bus bar and the secondary connection bus bars are preferably mounted to a connection frame, and the at least one actuation element is configured to move the connection frame for changing the state of the contactor device to and from the series connection state and to and from the parallel connection state. In addition, in this case the connection bus bar and/or the secondary connection bus bars may optionally have deflectable contact regions, which can be moved in addition to moving the connection frame when the at least one actuator element changes the state of the contactor device.

For reducing a contact resistance in the series connection state and in the parallel connection state, each of the second bus bars preferably comprises a plurality of contact elements arranged at different sides of the second bus bars, and each of the second bus bars is preferably configured to be conductively coupled to the connection bus bar at a contact side of the second bus bar different from a contact side for conductively coupling to one of the first bus bars. For example, a contact side of the second bus bar for contacting the connection bus bar may be arranged on the second bus bar opposite to a contact side for contacting one of the first bus bars. In other words, the connection bus bars may be formed of a double-sided silver-buttoned set of bus bars, wherein the silver buttons enable to reduce the contact resistance in the series connection state and in the parallel connection state.

In another advantageous example, the at least one actuation element comprises a dedicated actuator for changing the state of the contactor device to and from the series connection state and the parallel connection state. In this manner, it is possible to optimize the dedicated actuator for providing efficient force transition when changing the state of the contactor device between the series connection state and the parallel connection state.

In another advantageous example, the contactor device can further comprise two third bus bars, wherein one of the third bus bars is electrically connected to the other one of the second terminals, and the other one of the third bus bars is electrically connected to the other one of the third terminals, and wherein the at least one actuation element is configured to change a state of the contactor device to and from a closed state, in which each of the third bus bars is conductively coupled to respectively one of the first bus bars and to and from an open state, in which the two third bus bars and the two second bus bars are electrically isolated from the two first bus bars. In this manner, the contactor device also allows to prevent a current flow through the contactor device in the open state. Accordingly, in this example the contactor device of the present disclosure allows to apply voltages of at least three voltage levels between the two first contacts, namely zero voltage in the open state, the full battery voltage in the series connection state (and the closed state), and a voltage corresponding to the module voltage of the battery modules, which form the battery in the parallel connection state (and closed state).

According to another advantageous example, each of the third bus bars may comprise a deflectable contact region, which is capable of elastically deflecting between an open position, in which each of the third bus bars is electrically isolated from the two first bus bars and a closed position, in which each of the two third bus bars is conductively coupled to respectively one of the first bus bars. In this manner a transition force provided by the at least one actuation element for changing the state of the contactor device from the open state to the closed state can be transmitted effectively, since it is not necessary to move the second bus bars as a whole. In an alternative example, the third bus bars may be moved as a whole between the open position and the closed position.

In order to prevent current flow through the contactor device, when the contactor device is unpowered, the contactor device may be in the open state, when the at least one actuation element is not powered. For example, this can be realized by using at least one electromagnetic actuator for changing the state of the contactor device from the open to the closed state. The same or a different electromagnetic actuator can then be also used for changing the state of the contactor device to and from the series connection state and to and from the parallel connection state.

In another advantages example, a state of the contactor device may be only changed, when the at least one actuation element is powered. In this manner the contactor device allows to provide bi-stable states, and a state of the contactor device is not changed when a sudden loss of power to the at least one actuation element occurs, for example resulting from a single point fault, another damage event or a communication error, but the contactor device stays in its prior state. For example, this can be realized by using a linear motor actuator, which stays in its position when not being powered, as actuation element for changing the state of the contactor device from the open to the closed state. The same or a second linear motor actuator may be also used for changing the state of the contactor device to and from the series connection state and to and from the parallel connection state.

In another advantageous example, the contactor device optionally comprises at least one pyrotechnic actuator, which, upon activation, is configured to irreversibly prevent current flow through each of the first bus bars. Accordingly, the contactor device can additionally integrate the functions of an overcurrent protection device since the pyrotechnic actuator can for example been activated in the case of an overcurrent in the energy storage system, or another malfunction of the energy storage system, and may then cut the current through the contactor device within a reaction time in the range of a few milliseconds.

Preferably, the at least one pyrotechnic actuator may, upon activation, be configured to move the two first bus bars into a fired position, wherein in the fired position, each of the two first bus bars is irreversibly displaced or severed. This arrangement has the advantage that the at least one actuator configured for regular operation of the contactor device and the pyrotechnic actuator configured for safety operation of the contactor device can be designed and operated independently from each other. Accordingly, the force generated by the pyrotechnic actuator can be used completely for displacing or severing the two first bus bars and a contact separation at greater speed and distance can be achieved. Furthermore, there is less opportunity for a failure of both actuation mechanisms simultaneously, so that the operation reliability of the contactor device can be enhanced.

In addition, the contactor device may further comprise at least one arc suppressing element, which can control the development of arcing when the two first bus bars are irreversibly displaced or severed by firing the pyrotechnic actuator. The arc suppressing elements may for example comprise one or more mechanical devices, such as an array of arc splitter plates or an arc blowout magnet. Alternatively, or additionally, the arc suppressing elements may also comprise a gas generator charge, which is ignited when the pyrotechnic actuator is activated, in order to generate a gas that cools the arc or mixes the arc with air.

In another advantageous example the at least one pyrotechnic actuator, upon activation, may be configured to irreversibly drive at least one isolation element into a fired position, wherein in the fired position, the isolation element electrically isolates the two third bus bars and the two first bus bars from each other. In this manner, the isolation element, which is irreversibly driven between the two third bus bars and the two second bus bars, can irreversibly prevent current flow through the contactor device, while at the same time can function as an arc suppression element.

For achieving an especially effective solution for providing arc suppression when the two third bus bars and the two second bus are separated, the isolation element may for example comprise at least two isolation caps, wherein in the fired position each of the at least two isolation caps completely encompasses a contact region of respectively one of the first bus bars.

The present invention also relates to an energy storage system, which comprises a battery formed of at least a first battery module and a second battery module and the contactor device according to the present disclosure, wherein the first battery module is electrically connected to the two second terminals of the contactor device, and the second battery module is electrically connected to the third terminals of the contactor device. The energy storage system may be for example provided in a vehicle for powering the motor of the vehicle. Alternatively, the energy storage system may be a stationary energy storage system, for example used for storing renewable or conventionally generated energy.

Throughout this document, the term "terminal" is meant to describe a point at which a conductor from an electric device, an electric circuit or an electric component ends, and where a point is provided for electrically connecting an external electric device, an external electric circuit or an external electric component to this conductor. Furthermore, the terms "electrically connected" and "conductively coupled" describe the establishing of an electrical connection between at least two electric devices, electric components or electric conductors, which allows the flow of electric current. Hereby the electrical connection should not be restricted to a direct coupling of the terminals of the at least two electric devices, electric components or electric conductors, but other electric devices, electric components or electrical conductors may be coupled in between.

The accompanying drawings are incorporated into the specification and form a part of the specification to illustrate several examples of the present disclosure. These drawings, together with the description serve to explain the principles of the disclosure. The drawings are merely for the purpose of illustrating the preferred and alternative examples of how the disclosure can be made and used, and are not to be construed as limiting the disclosure to only the illustrated and described examples. Furthermore, several aspects of the examples may form—individually or in different combinations—solutions according to the present disclosure. The following described examples thus can be considered either alone or in an arbitrary combination thereof. Further features and advantages will become apparent from the following more particular description of the various examples of the disclosure, as illustrated in the accompanying drawings, in which like references refer to like elements, and wherein:

Figure 1:
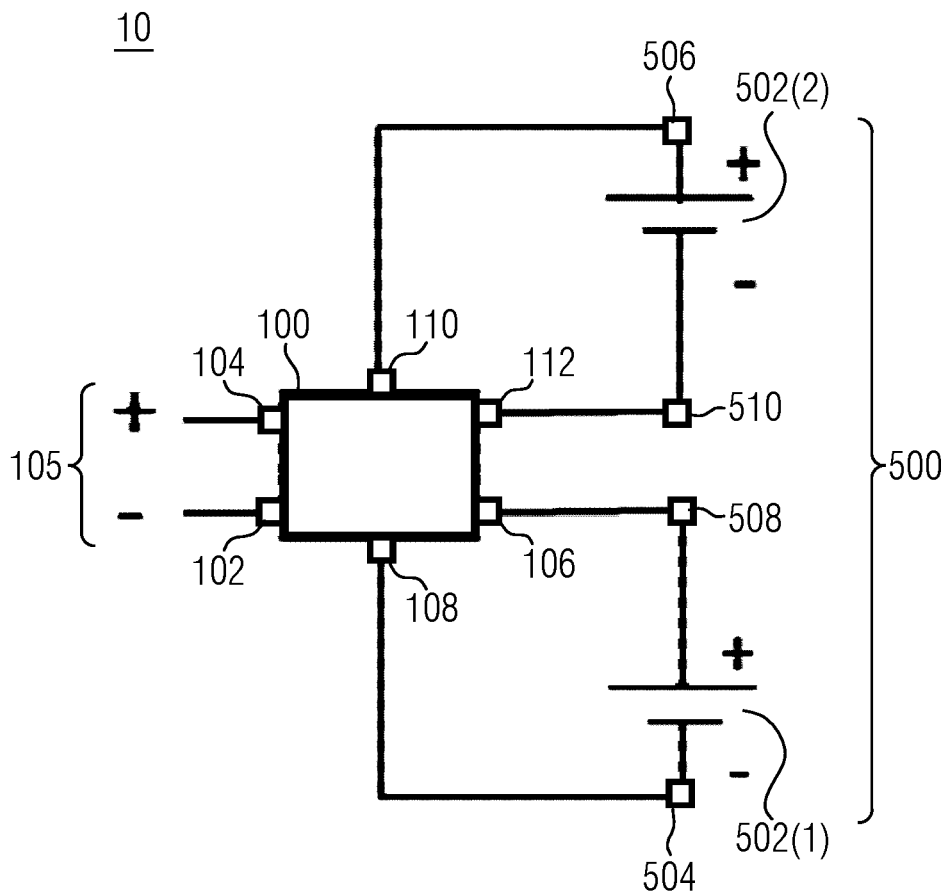
FIG. 1 shows a schematic circuit diagram of an exemplary high voltage energy storage system.

The present disclosure will now be further explained referring to the Figures, and firstly referring to FIG. 1. FIG. 1 shows a schematic circuit diagram of an exemplary high voltage energy storage system 10 that can benefit from the ideas of the present disclosure. In an application scenario exemplarily described in the following the energy storage system 10 may be used in an electric vehicle as a power supply for electric loads like an electric motor, which are supplied at a predetermined high voltage. However, the energy storage system 10 may also be used in other application scenarios, which require the storage and/or supply of high voltage energy in a plurality of battery modules, which form a battery for supplying the predetermined high voltage.

The energy storage system 10 comprises a contactor device 100 and first and second battery modules (or battery packs) 502(1) and 502(2), which form a high voltage battery 500. In alternative to the example shown in FIG. 1, a number of the battery modules 502(1) and 502(2), which form the battery 500, may be larger than two, so that in general the number of battery modules 502, which form the high voltage battery is N, wherein N is a natural number and larger or equal to 2. Since the battery modules 502(1) and 502(2) are subunits of the high voltage battery 500, they provide module voltages, which sum up to the predetermined high voltage, which can be output by the high voltage battery 500 to the high voltage bus 105. The value of the module voltage provided by each of the battery modules 502 can be obtained by dividing with N the predetermined high voltage value output from the high voltage battery 500, wherein N may be the number of battery modules 502. For example, when the battery 500 outputs a predetermined high voltage value of 800 V, and N=2, battery modules 502 share and output a module voltage of (800 V/2)=400 V. On a smaller scale, each of the battery modules 502 comprises a plurality of battery cells electrically connected in series. Hereby, a battery cell may be a physical battery cell or may comprise several physical battery cells electrically connected in parallel on a cell level.

As can be seen from FIG. 1, the contactor device 100 is configured to electrically connect the high voltage battery 500 to a high voltage bus 105, which may be electrically connected to an electric motor of an electric vehicle, for supplying the predetermined high voltage, or which may be connected to a charger for charging the high voltage battery 500. Hereby, the contactor device 100 allows to change a voltage applied by the high voltage battery 500 to the high voltage bus 105 according to states of the contactor device as will be described in the following.

The contactor device 100 comprises load-side terminals 102 and 104 (which may be also signified as "first terminals") for electrically connecting a high-potential side (+) and a low-potential side (−) of high voltage bus 105.

Furthermore, the contactor device 100 comprises terminals 108 and 110, which can be electrically connected to the terminals of those battery modules 502, which correspond to the terminals of the high voltage battery 500 at a high potential side (+) and at a low potential side (−), respectively. For example, in FIG. 1 the terminal 108 is electrically connected to a terminal 504 of the high voltage battery 500 at the low-potential side, which corresponds to a low-potential side terminal of battery module 502 (1) arranged at the low-potential side of the high voltage battery 500. In other words, the terminal 504 of the high voltage battery 500 corresponds to the low-potential side terminal of battery module 502(1) in FIG. 1. Likewise, in FIG. 1 the terminal 110 is electrically connected to a terminal 506 of the high voltage battery 500 at the high-potential side, which corresponds to a high-potential side terminal of battery module 502(2) arranged at the high-potential side of the high voltage battery 500. In other words, the terminal 506 of the high voltage battery 500 corresponds to the high-potential side terminal of battery module 502(2) in FIG. 1.

Further, the contactor device 100 comprises terminals 106 and 112 which can be electrically connected to the remaining terminals 508 and 510 of the battery modules 502(1) and 502(2), which are terminals other than those terminals 504 and 506, which correspond to the terminals of the high voltage battery 500 at the high potential side (+) and at the low potential side (−), respectively. For example, in FIG. 1 the terminal 106 of the contactor device 100 is electrically connected to the high-potential side terminal 508 of battery module 502(1), which is arranged at the low-potential side of the high voltage battery 500. Likewise, in FIG. 1 the terminal 112 is electrically connected to the low-potential side terminal 510 of battery module 502(2), which is arranged at the high-potential side of the high voltage battery 500.

Stated differently, the contactor device 100 comprises two terminals 106 and 108 ("second terminals") for electrically connecting the terminals 504 and 508 of first battery module 502(1), wherein the low-potential side terminal 504 of the first battery module 502(1) corresponds to the terminal 504 of the high voltage battery 500 at the low-potential side. Further, the contactor device 100 comprises two terminals 110 and 112 ("third terminals"), for electrically connecting the terminals 506 and 510 of second battery module 502(2), wherein the high-potential side terminal 506 of the second battery module 502(2) corresponds to the terminal 506 of the high voltage battery 500 at the high-potential side.

Figure 2:
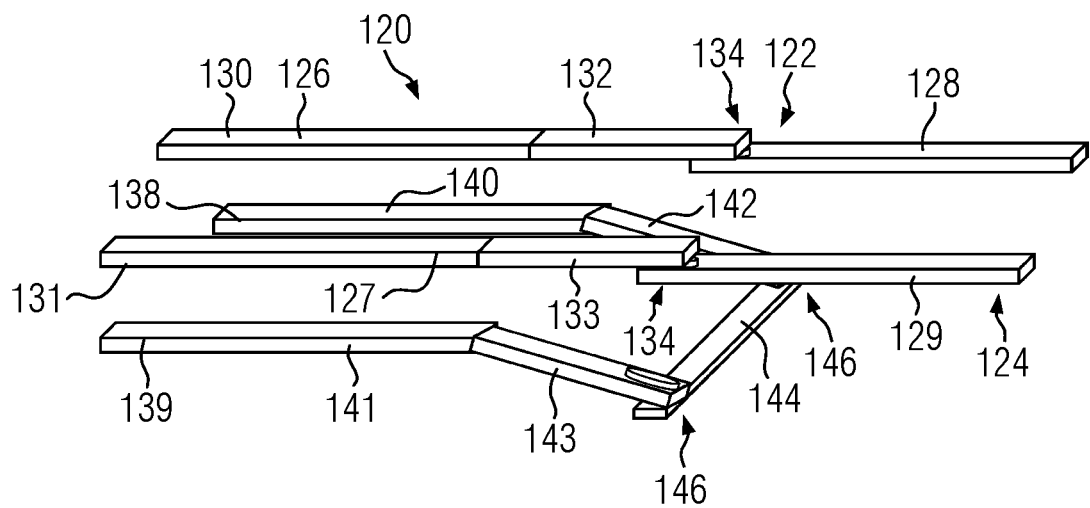
FIG. 2 shows a schematic perspective view of a first exemplary contact arrangement in a series connection state of the contactor device.
Figure 3:
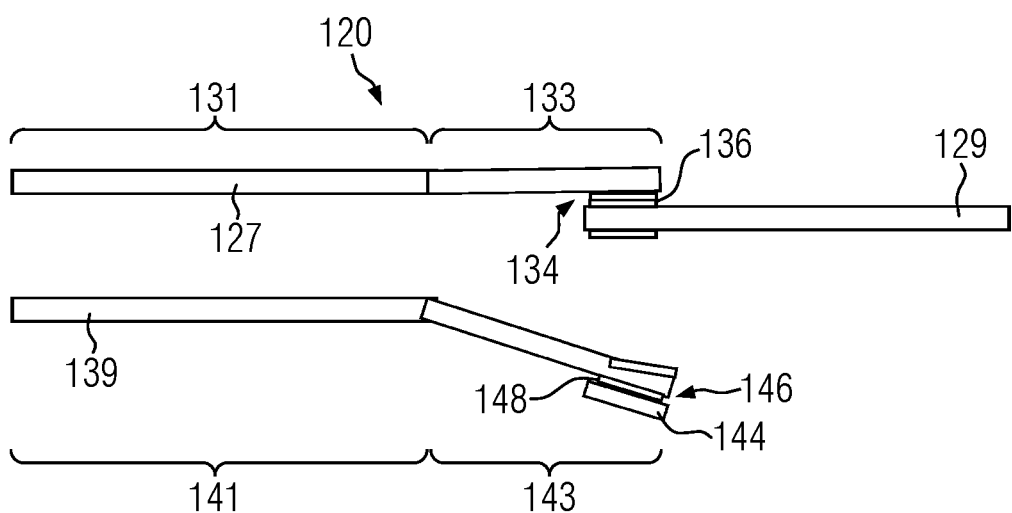
FIG. 3 shows a schematic side view of the first exemplary contact arrangement in the series connection state of the contactor device.
Figure 4:
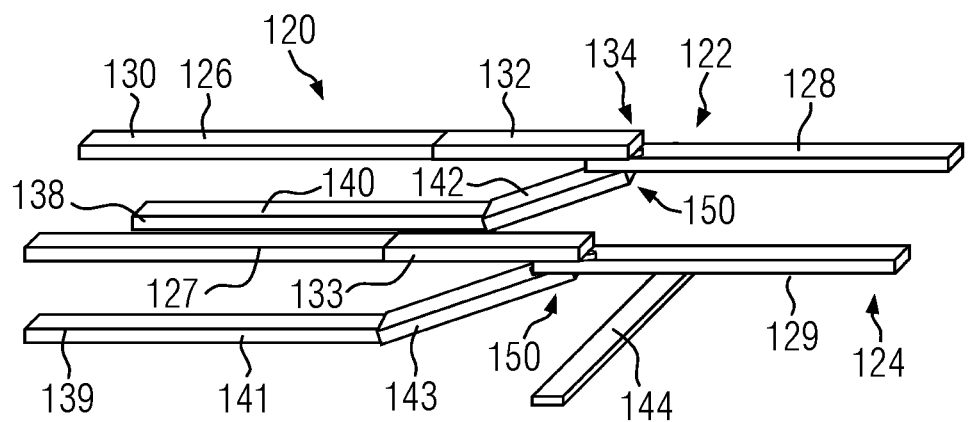
FIG. 4 shows a schematic perspective view of the first exemplary contact arrangement in a parallel connection state of the contactor device.
Figure 5:
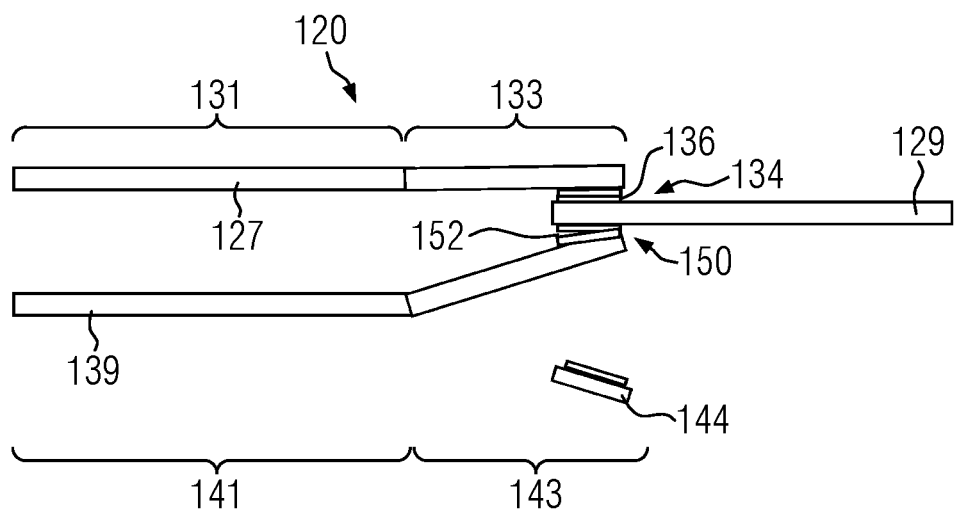
FIG. 5 shows a schematic side view of the first exemplary contact arrangement in the parallel connection state of the contactor device.
Figure 6:
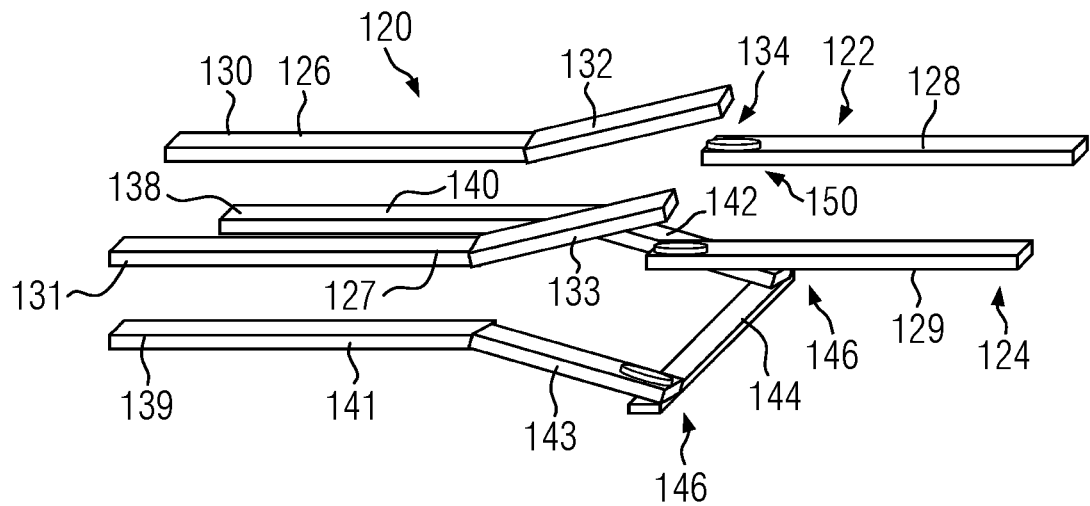
FIG. 6 shows a schematic perspective view of the first exemplary contact arrangement in an open state of the contactor device.
Figure 7:
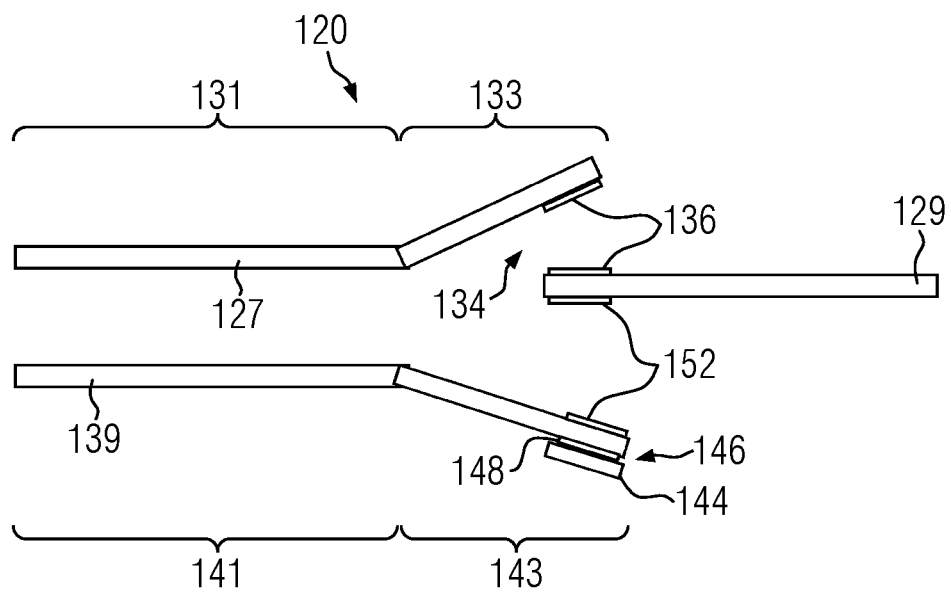
FIG. 7 shows a schematic side view of the first exemplary contact arrangement in the open state of the contactor device.

A first example of the contactor device 100 will now be described with reference to FIGS. 2 to 7. FIGS. 2 to 7 each show a first example of a contact arrangement 120 of the contactor device 100 in different states of the contactor device 100. In particular, FIGS. 2 and 3 show the contact arrangement 120 in a series connection state of the contactor device 100, FIGS. 4 and 5 show the contact arrangement 120 in a parallel connection state of the contactor device 100, and FIGS. 6 and 7 show the contact arrangement 120 in an open state of the contactor device 100.

In the example shown in FIGS. 2 to 7, the contact arrangement 120 comprises two contacts 122 and 124, which each may comprise two moveable bus bars (or "third bus bars") 126, 127 and two fixed bus bars (or "first bus bars") 128, 129, so that the contactor device 100 can function as a 2 pole single-break style contactor. Here, the functions of each of the fixed bus bars 128, 129, and each of the moveable bus bars 126, 127 are mirrored. However, it should be noted here that the number two moveable bus bars 126, 127 and two fixed bus bars 128, 129 is not limiting for the present disclosure, but the present disclosure is applicable for contactor devices having more than two contacts 122, 124 and accordingly more than two moveable bus bars 126, 127 and more than two fixed bus bars 128, 129.

The moveable bus bars 126, 127 and the fixed bus bars 128, 129 may preferably be formed from a metallic material like copper or one of its alloys, however also other suitable electric conducting materials, which are known in the art and which supports continuous currents of 500 A or more, current peaks of up to 5 kA for at least 1 second or up to 10 kA or more for at least 50 ms through the moveable bus bars 126, 127 and the fixed bus bars 128, 129, may be used.

Preferably, the moveable bus bars 126, 127 may be formed of flexible bus bars, which comprise a rigid region 130, 131, which hardly moves when the moveable bus bars 126, 127 are moved between an open position (shown in FIGS. 6 and 7) and a closed position (shown in FIGS. 2 to 5), and a flexible region 132, 133, which is able to elastically deflect between the open position and the closed position. Preferably, this can be achieved by forming the moveable bus bars 126, 127 of a multi-layer structure, which comprises for example 10 to 15 layers of copper or other suitable electrically conducting material, at least in the flexible region 132, 133. In another example, the moveable bus bars 126, 127 may be composed of a fixed bus bar in the rigid region 130, 131 and of a moveable bus bar in the flexible region 132, 133, which may be for example moved in a rotational movement around a rotation axis for moving the moveable bus bar 126, 127 between the open position and the closed position. Alternatively, the moveable bus bars 126, 127 may be moved as a whole when being moved between the open position and the closed position.

In the first example of the contactor device 100, the moveable bus bar 126 is electrically connected to the terminal 110, which is electrically connected to the terminal 506 of the high voltage battery 500 at the high-potential side of the high voltage battery 500, i.e. the high-potential side terminal 506 of battery module 502(2), and the fixed bus bar 128 is electrically connected to load-side terminal 104, which is electrically connected to the high-potential side of the high voltage bus 105. The moveable bus bar 127 is electrically connected to the terminal 108, which is electrically connected to the terminal 504 of the high voltage battery 500 at the low-potential side of the high voltage battery 500, i.e. the low-potential side terminal 504 of battery module 502(1) and the fixed bus bar 129 is electrically connected to the other one of the load-side terminals 102, which is electrically connected to the low-potential side of the high voltage bus 105.

FIGS. 2 to 5 show the moveable bus bars 126, 127 in the closed position, so that the moveable bus bars 126, 127 are conductively coupled to the fixed bus bars 128, 129 at least at first contact points 134 of the contactor device. For reducing a contact resistance, contact elements 136, for example made of silver or any silver alloy, may be mounted to both of the moveable bus bars 126, 127 and the fixed bus bars 128, 129 in the region of the first contact points 134. Of course, also other suitable electrically conducting materials may be used for forming the contact elements 136.

In addition to allowing switching to and from a closed state of the contactor device 100, where the moveable bus bars 126, 127 are in the closed position, and to and from the open state of the contactor device 100, where the moveable bus bars 126, 127 are in the open position, the contactor device 100 also allows switching between a parallel connection state, in which at least two battery modules 502(1) and 502(2) can be connected in parallel to the high voltage bus 105, and a series connection state, in which the battery modules 502(1) and 502(2) can be connected in series to the high voltage bus 105.

For this purpose, the contactor device 100 comprises two second bus bars 138 and 139 and a connection bus bar 144. In the first example of the contactor device 100, second bus bar 138 is electrically connected to the terminal 106, which is electrically connected to the high-potential side terminal 508 of battery module 502(1) arranged at the low-potential side of the high voltage battery 500. Likewise, in the first example the second bus bar 139 is electrically connected to the terminal 112, which is electrically connected to the low-potential side terminal 510 of battery module 502(2), which is arranged at the high-potential side of the high voltage battery 500.

The two second bus bars 138, 139 and the connection bus bar 144 may be formed from the same materials as the moveable bus bars 126, 127 and the fixed bus bars 128, 129, and may be provided on a level of the contactor device different from the level, where the moveable bus bars 126, 127 and the fixed bus bars 128, 129 are provided. As shown in FIGS. 2 to 7, the two second bus bars 138, 139 may extend in the same direction as the contacts 122 and 124. The second bus bars 138, 139 may however also have a different extension direction.

Preferably, the second bus bars 138, 139 may be formed in the same manner as the moveable bus bars 126, 127, as a second set of moveable bus bars. For example, the second set of bus bars 138, 139 may comprise a rigid region 140, 141, which hardly moves when the second bus bars 138, 139 are moved between a series connection position (shown in FIGS. 2 and 3) and a parallel connection position (shown in FIGS. 4 and 5), and a flexible region 142, 143, which is able to deflecting elastically between the series connection position and the parallel connection position. In another example, the second bus bars 138, 139 may be composed of fixed bus bars in the rigid region 140, 141 and of moveable bus bars in the flexible region 142, 143, which may be for example moved in a rotational movement around a rotation axis for moving the second bus bars 138, 139 between the series connection position and the parallel connection position. Alternatively, the second bus bars 138, 139 may be moved as a whole when being moved between the series connection position and the parallel connection position.

The connection bus bar 144, may for example be formed of a rigid bus bar, which is fixed to the contact arrangement 120, in a place, where it is electrically isolated from the moveable bus bars 126, 127 and the fixed bus bars 128, 129, which form the contacts 122 and 124. Preferably, the connection bus bar 144 extends in a direction substantially perpendicular to an extension direction of the second bus bars 138, 139 and substantially perpendicular to the direction of the flexible regions 142, 143. However, also other extension directions of the connection bus bar 144 are possible, as long as the second bus bars 138, 139 are capable of conductively coupling to the connection bus bar 144.

FIGS. 2 and 3 show the contactor device 100 in the series connection state, where the second bus bars 138 and 139 are in the series connection position, and each of the second bus bars 138 and 139 is conductively coupled to the connection bus bar 144 at second contact points 146. Accordingly, in this state the second bus bar 138 and the second bus bar 139 are electrically connected in series. In other words, in the series connection state, the contactor device 100 allows current to flow from the second bus bar 138 to the second bus bar 139 and vice versa, and the second bus bar 138 and 139 are on the same electric potential. On the other hand, in the series connection state, the second bus bars 138 and 139 are electrically isolated from the moveable bus bars 126, 127 and the fixed bus bars 128, 129.

Accordingly, in the series connection state of the contactor device 100, the terminals 106 and 112 electrically connect battery modules 502(1) and 502(2) in series by providing a conducting path through the second bus bars 138 and 139, which are both conductively coupled to connection bus bar 144. Consequently, the predetermined high voltage of the battery 500, which is a sum of the module voltages of battery modules 502(1) and 502(2), can be applied to the high voltage bus 105 by conductively coupling the moveable bus bars 126, 127 and the fixed bus bars 128, 129, i.e. closing the contacts 122 and 124.

For reducing a contact resistance between the second bus bars 138, 139 and the connection bus bar 144, contact elements 148, for example made of silver or any silver alloy, may be mounted to a first contact side of the second bus bars 138, 139 and to the connection bus bar 144 in the region of the second contact points 146. Of course, also other suitable electrically conducting materials may be used for forming the contact elements 146.

FIGS. 4 and 5 show the contactor device 100 in the parallel connection state, where the second bus bars 138 and 139 simultaneously are in the parallel connection position at third contact points 150. Accordingly, in this state the second bus bar 138 is electrically connected in parallel to the moveable bus bar 126, and the second bus bar 139 is electrically connected in parallel to the moveable bus bar 127. In other words, in the parallel connection state, the contactor device 100 allows current to flow from the second bus bar 138 to the moveable bus bar 126 and the fixed bus bar 128, and vice versa, and the second bus bar 138, the moveable bus bar 126 and the fixed bus bar 128 are on the same electric potential. Similar, in the parallel connection state, the contactor device 100 allows current to flow from the second bus bar 139 to the moveable bus bar 127 and the fixed bus bar 129, and vice versa, and the second bus bar 139, the moveable bus bar 127 and the fixed bus bar 129 are on the same electric potential. On the other hand, in the parallel connection state, the second bus bars 138 and 139 are electrically isolated from connection bus bar 144.

Accordingly, in the parallel connection state of the contactor device 100, the terminals 106 and 112 electrically connect battery modules 502(1) and 502(2) in parallel by providing a conducting path from the terminal 106 to the fixed bus bar 128 through the second bus bar 138, and a conducting path from the terminal 112 to the fixed bus bar 129 through the first connection contact 139. Consequently, a voltage which results from electrically connecting the battery modules 502(1) and 502(2) in parallel can be applied to the high voltage bus 105 by conductively coupling the moveable bus bars 126, 127 and the fixed bus bars 128, 129, i.e. closing the contacts 122 and 124. Ideally, for the case of electrically connecting the two battery modules 502(1) and 502(2) to the contactor device 100, the resulting voltage is half of the predetermined high voltage of high voltage battery 500, and for example results to 400 V when the battery 500 outputs a predetermined high voltage value of 800 V.

For reducing a contact resistance in the parallel connection state, contact elements 152, for example made of silver or any silver alloy, may be mounted to at a second contact side of the second bus bars 138, 139 for contacting the fixed bus bars 128, 129, and to the fixed bus bars 128, 129 in the region of the third contact points 150. Of course, also other suitable electrically conducting materials may be used for forming the contact elements 138.

Hence, by providing the at least partly moveable second bus bars 138 and 139 and the connection bus bar 144, the present disclosure allows to distinguish between two additional states when the contactor device is in the closed state, namely the series connection state, where it is possible to electrically connect the two battery modules 502(1) and 502(2) in series, and the parallel connection state, where it is possible to electrically connect the two battery modules 502(1) and 502(2) in parallel.

FIGS. 6 and 7 show the contactor device 100 in the open state, where the moveable bus bars 126, 127 are in the open position and are electrically isolated from the fixed bus bars 128 and 129. The second bus bars 138 and 139 are conductively coupled to the connection bus bar 144 and accordingly are also electrically isolated from the fixed bus bars 128, 129. Accordingly, no voltage is applied to the fixed bus bars 128, 129 in the open state of the contactor device 100.

For moving the moveable bus bars 126 and 127 between the open position and the closed position and for moving the second bus bars 138 and 139 between the series connection position and the parallel connection position the contactor device 100 comprises at least one actuator (not shown in FIGS. 2 to 7). Hereby the moveable bus bars 126 and 127 and the second bus bars 138 and 139 may be individually moved by the same actuator for changing the state of the contactor device, or a dedicated first actuator may be provided for individually moving the two moveable bus bars 126 and 127 and a dedicated second actuator may be provided for individually moving the second bus bars 138 and 139. Possible configurations of the at least one actuator provided in the contactor 100, are later described with respect to FIGS. 16 to 20.

A second example of a contact arrangement 220 of the contactor device 100 will now be described with reference to FIGS. 8 to 13. The second exemplarily contact arrangement 220 differs from the first exemplarily contact arrangement 120, in that the connection bus bar 144 is arranged in a moveable manner on a connection frame, which is moveable for bringing the contactor device 100 in the parallel connection state or in the series connection state.

Figure 8:
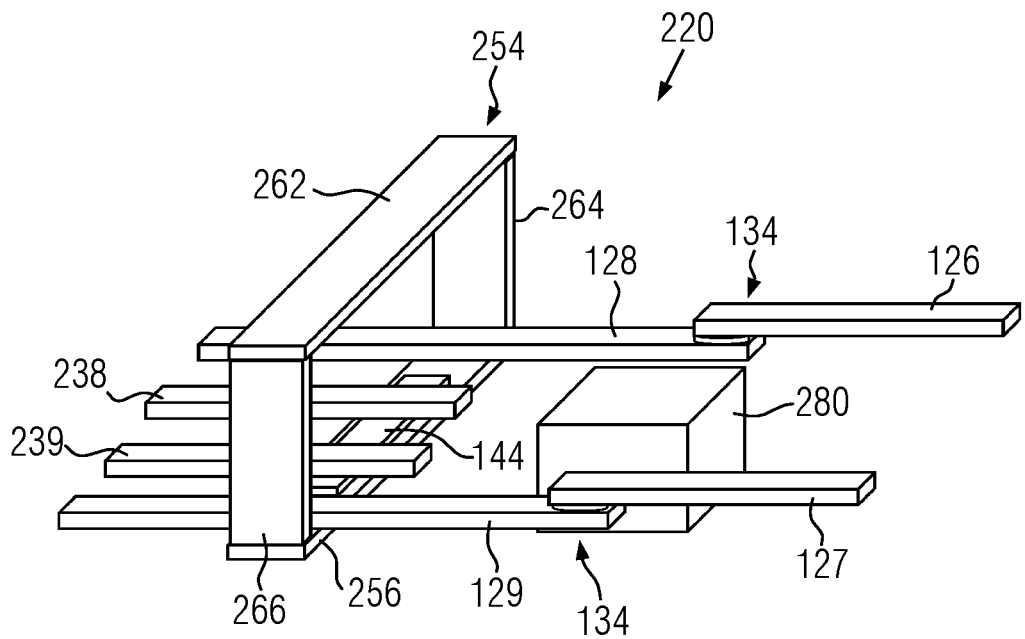
FIG. 8 shows a schematic perspective view of a second exemplary contact arrangement in the series connection state of the contactor device.
Figure 9:
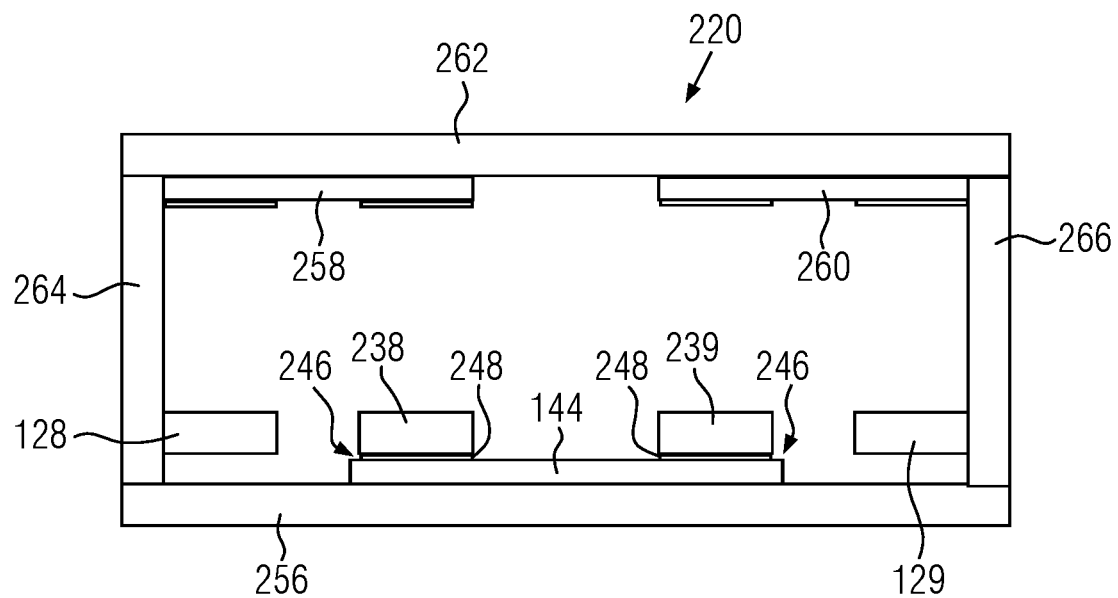
FIG. 9 shows a schematic cross sectional view of the second exemplary contact arrangement in the series connection state of the contactor device.
Figure 10:
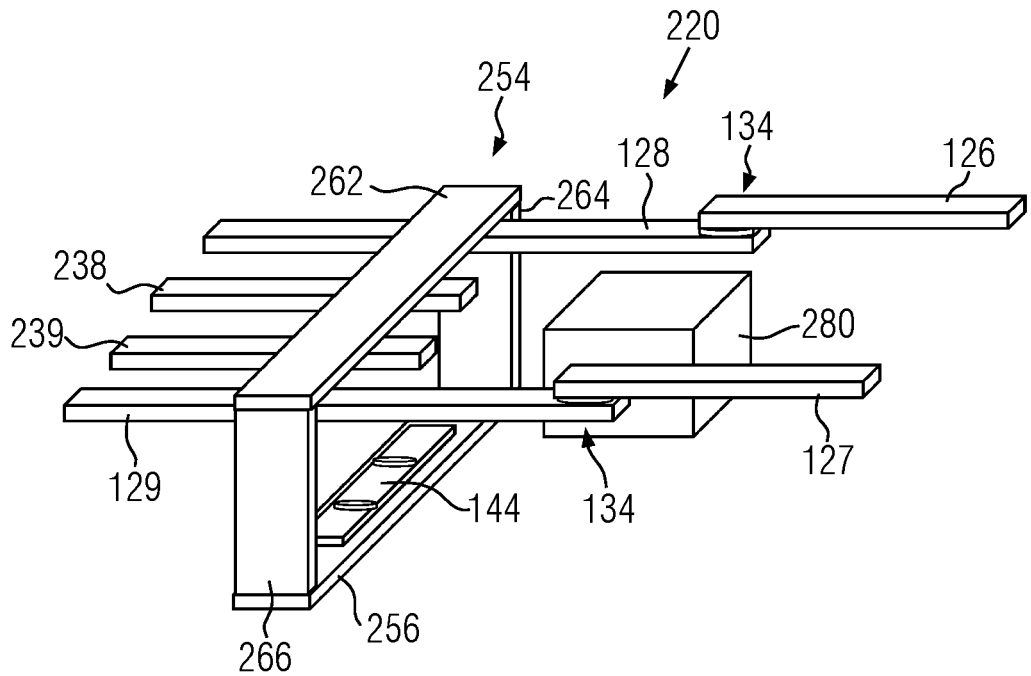
FIG. 10 shows a schematic perspective view of the second exemplary contact arrangement in the parallel connection state of the contactor device.
Figure 11:
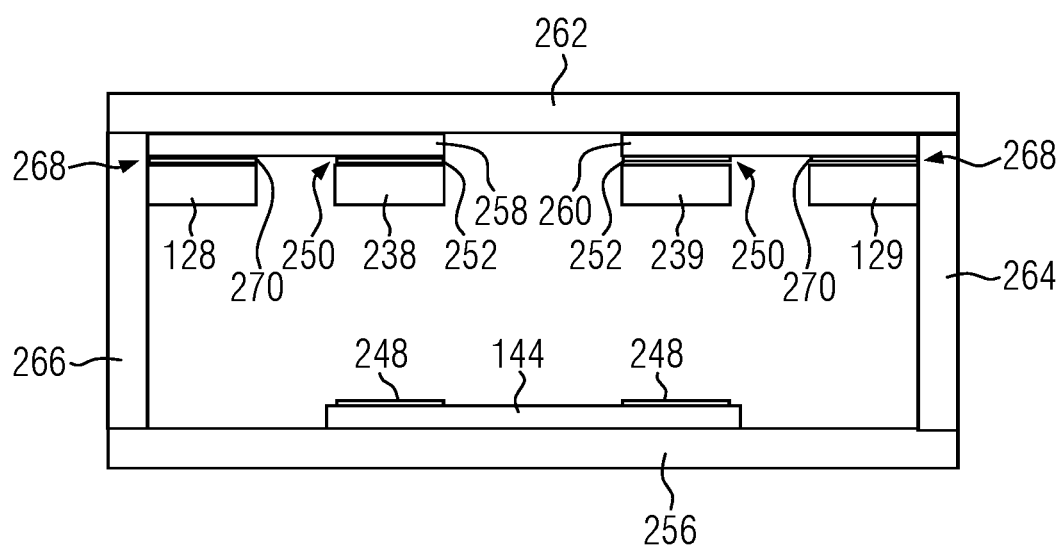
FIG. 11 shows a schematic cross sectional view of the second exemplary contact arrangement in the parallel connection state of the contactor device.
Figure 12:
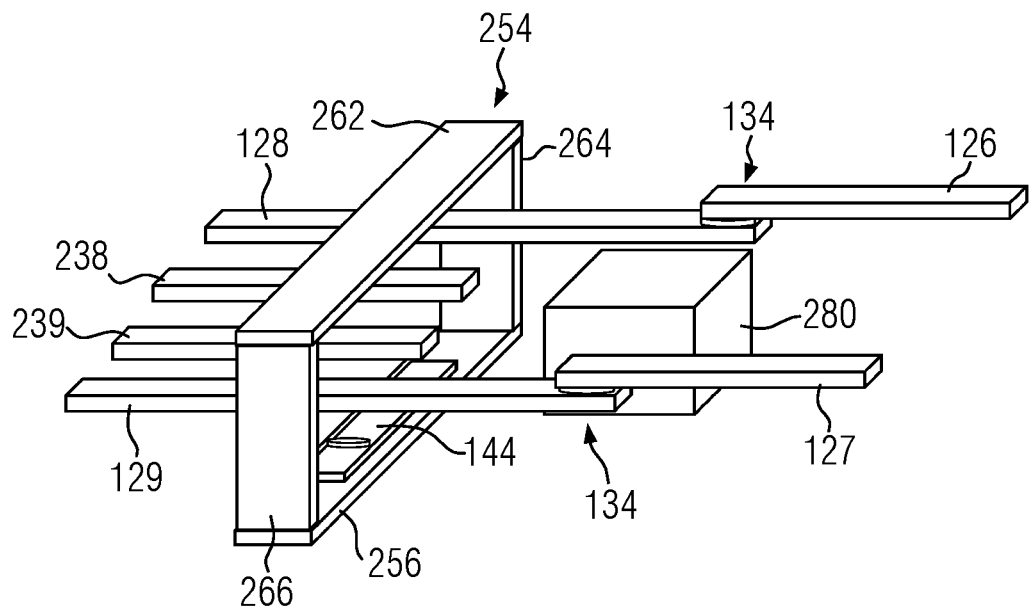
FIG. 12 shows a schematic perspective view of the second exemplary contact arrangement in an open state of the contactor device.
Figure 13:
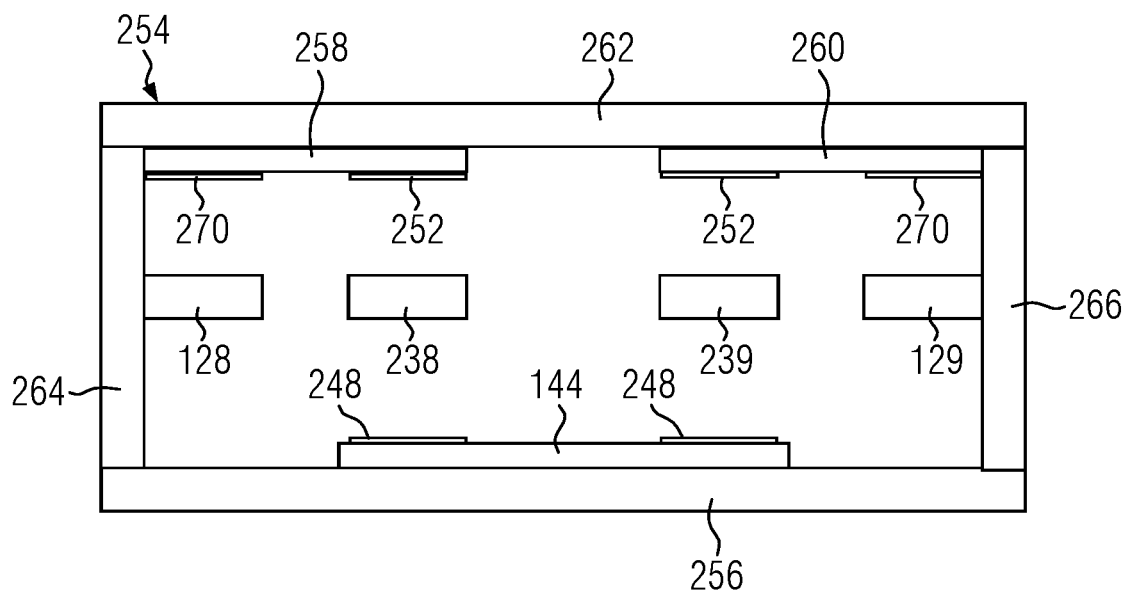
FIG. 13 shows a schematic cross sectional view of the second exemplary contact arrangement in an open state of the contactor device.

In particular, FIGS. 8 and 9 show the contact arrangement 220 in the series connection state of the contactor device 100, FIGS. 10 and 11 show the contact arrangement 220 in the parallel connection state of the contactor device 100, and FIGS. 12 and 13 show the contact arrangement 220 in an open state of the contactor device 100.

In contrast to the first example, in the contact arrangement 220 the fixed bus bar 128 is electrically connected to the terminal 110, which is electrically connected to the terminal 506 of the high voltage battery 500 at the high-potential side of the high voltage battery 500, i.e. the high-potential side terminal 506 of battery module 502(2). The fixed bus bar 128 may be capable of being conductively coupled to the moveable bus bar 126 at a first contact point 134, and the moveable bus bar 126 may be electrically connected to the load-side terminal 104 of the contactor device 100.

The fixed bus bar 129 is electrically connected to the terminal 108, which is electrically connected to the terminal 504 of the high voltage battery 500 at the low-potential side of the high voltage battery 500, i.e. the low-potential side terminal 504 of battery module 502(1). The fixed bus bar 129 may be capable of being conductively coupled to the moveable bus bar 127 at a first contact point 134, and the moveable bus bar 127 may be electrically connected to the load-side terminal 102 of the contactor device 100. However, it is not necessary that the contact arrangement 220 comprises moveable bus bars 126, 127, but the fixed bus bar 128 may be electrically connected directly to load-side the terminal 104 and the fixed bus bar 129 may be electrically connected directly to the load-side terminal 102.

In addition, the contact arrangement 220 comprises two second bus bars 238 and 239 and a connection bus bar 144. The second bus bar 238 is electrically connected to the terminal 106, which is electrically connected to the high-potential side terminal 508 of battery module 502(1) arranged at the low-potential side of the high voltage battery 500. The second bus bar 239 is electrically connected to the terminal 112, which is electrically connected to the low-potential side terminal 510 of battery module 502(2), which is arranged at the high-potential side of the high voltage battery 500.

The two second bus bars 238, 239 and the connection bus bar 144 may be formed from the same materials as the fixed bus bars 128, 129, and the two second bus bars 238, 239 may be provided on a same level of the contactor device 100 as the fixed bus bars 128, 129. As shown in FIGS. 8 to 13, the two second bus bars 238, 239 may extend in the same direction as the fixed bus bars 128 and 129, but may however also have a different extension direction.

In the second example, the second bus bars 238, 239 may be formed in the same manner as the fixed bus bars 128, 129, i.e. as a second set of fixed bus bars. The connection bus bar 144, may for example be formed of a rigid bus bar, which is fixed to a base plate 256 of a moveable connection frame 254. Hereby, the connection bus bar 144 is mounted in such manner to the base plate 256 that the connection bus bar 144 is capable of being conductively coupled to each of the second bus bars 238 and 239, when the connection bus bar 144 is brought in a series connection position by moving the connection frame 254. Preferably, the connection bus bar 144 extends in a direction substantially perpendicular to an extension direction of the second bus bars 238, 239. However, also other extension directions of the connection bus bar 144 are possible, as long as the second bus bars 238, 239 are capable of conductively coupling to the connection bus bar 144.

In addition, the contact arrangement 220 comprises two secondary connection bus bars 258 and 260, which may be formed of rigid bus bars in analogy to the connection bus bar 144. Each of the secondary connection bus bars 258 and 260, may for example be formed of a rigid bus bar, which is fixed on a bottom side of a cover plate 262 of the moveable connection frame 254. Hereby, the secondary connection bus bars 258 and 260 are mounted in such manner to the bottom side of the cover plate 262 that the secondary bus bar 258 is capable of being conductively coupled to each of the second bus bar 238 and the fixed bus bar 128 and the secondary bus bar 260 is capable of being conductively coupled to each of the second bus bar 239 and the fixed bus bar 129, when the secondary connection bus bars 258 and 260 are brought in a parallel connection position by moving the connection frame 254. Preferably, the secondary connection bus bars 258 and 260 extends in a direction substantially perpendicular to an extension direction of the second bus bars 238, 239. However, also other extension directions of the secondary connection bus bars 258, 260 are possible, as long as the second bus bars 258 and 260 are capable of conductively coupling to the second bus bar 238 and the fixed bus bar 128 or the second bus bar 239 and the fixed bus bar 129, respectively.

For allowing to move the connection bus bar 144 and the two secondary connection bus bars 258 and 260 simultaneously, the connection frame 254 may comprise side plates 264 and 266, which are mounted to opposite ends of the base plate 256 and the cover plate 262 and support the cover plate 262 to follow the movement of the base plate 254 and vice versa. With such a configuration, the connection frame 254 may surround the fixed bus bars 128, 129 and the second bus bars 238, 239 at four sides.

FIGS. 8 and 9 show the contact arrangement 220, when the connection bus bar 144 is in the series connection position, so that the contactor device 100 is in the series connection state. In the series connection position, the connection bus bar 144 is pressed against each of the second bus bars 238 and 239 by moving the connection frame 254, so that each of the second bus bars 238 and 239 is conductively coupled to the connection bus bar 144 at second contact points 246. Accordingly, in the series connection state of the contactor device 100, the second bus bars 238 and 239 are electrically connected in series. On the other hand, in the series connection state, since the secondary connection bus bars 258 and 260 are moved by the connection frame 254 away from the second bus bars 238 and 239, the second bus bars 238 and 239 are electrically isolated from the secondary connection bus bars 258. Consequently the second bus bars 238 and 239 are also electrically isolated from the fixed bus bars 128, 129.

Accordingly, in the series connection state of the contactor device 100, the terminals 106 and 112 electrically connect battery modules 502(1) and 502(2) in series by providing a conducting path through the second bus bars 238 and 239, which are conductively coupled to the connection bus bar 144. Consequently, the predetermined high voltage of the battery 500, which is a sum of the module voltages of battery modules 502(1) and 502(2), can be applied to the high voltage bus 105 by conductively coupling the moveable bus bars 126, 127 and the fixed bus bars 128, 129, at the first contact points 134.

For reducing a contact resistance between the second bus bars 238, 239 and the connection bus bar 144, contact elements 248, for example made of silver or any silver alloy, may be mounted to a first contact side of the second bus bars 238, 239 and to the connection bus bar 144 in the region of the second contact points 246. Of course, also other suitable electrically conducting materials may be used for forming the contact elements 246.

FIGS. 10 and 11 show the contact arrangement 220, when the secondary connection bus bars 258 and 260 simultaneously are in the parallel connection position, so that the contactor device 100 is in the parallel connection state. In the parallel connection position, the secondary connection bus bar 258 is pressed against the second bus bar 238 and the fixed bus bar 128 by moving the connection frame, so that the secondary bus bar 258 is conductively coupled at a third contact point 250 to the second bus bars 238 and at a fourth contact point 268 to the fixed bus bar 128.

Simultaneously, the secondary connection bus bar 260 is pressed against the second bus bar 239 and the fixed bus bar 129 by moving the connection frame, so that the secondary bus bar 260 is conductively coupled at a third contact point 250 to the second bus bars 239 and at a fourth contact point 268 to the fixed bus bar 129. On the other hand, in the parallel connection state, the connection bus bar 144 is moved by the connection frame 254 away from the second bus bars 238 and 239, so that the second bus bars 238 and 239 are electrically isolated from the connection bus bar 144 and from each other.

Accordingly, in the parallel connection state the second bus bar 238 is electrically connected in parallel to the fixed bus bar 128, and the second bus bar 239 is electrically connected in parallel to the fixed bus bar 129. In other words, in the parallel connection state, the contactor device 100 allows current to flow from the second bus bar 238 to the fixed bus bar 128 (through the secondary connection element 258), and vice versa, and the second bus bar 138 and the fixed bus bar 128 share the same electric potential. Similar, in the parallel connection state, the contactor device 100 allows current to flow from the second bus bar 239 to the fixed bus bar 129 (through the secondary connection element 260), and vice versa, and the second bus bar 239, and the fixed bus bar 129 share the same electric potential. On the other hand, in the parallel connection state, the second bus bars 238 and 239 are electrically isolated from connection bus bar 144.

Accordingly, in the parallel connection state of the contactor device 100, the terminals 106 and 112 electrically connect battery modules 502(1) and 502(2) in parallel by providing a conducting path from the terminal 106 to the fixed bus bar 128 through the second bus bar 238 and secondary connection element 258, and a conducting path from the terminal 112 to the fixed bus bar 129 through the second bus bar 239 and secondary connection element 260. Consequently, a voltage which results from electrically connecting the battery modules 502(1) and 502(2) in parallel can be applied to the high voltage bus 105 by conductively coupling the moveable bus bars 126, 127 and the fixed bus bars 128, 129. Ideally, for the case of electrically connecting the two battery modules 502(1) and 502(2) to the contactor device 100, the resulting voltage is half of the predetermined high voltage of high voltage battery 500, and for example results to 400 V when the battery 500 outputs a predetermined high voltage value of 800 V.

For reducing a contact resistance in the parallel connection state, contact elements 252, for example made of silver or any silver alloy, may be mounted to a second contact side of the second bus bars 238, 239 for contacting the secondary connection bus bars 258 and 260 respectively, and to the secondary connection bus bars 258 and 260 in the region of the third contact points 250. Similar contact elements 270, for example made of silver or any silver alloy, may be mounted to the secondary connection bus bars 258 and 260 respectively, and to the fixed bus bars 258 and 260 in the region of the fourth contact points 268. Of course, also other suitable electrically conducting materials may be used for forming the contact elements 252 and 270.

FIGS. 12 and 13 show the contactor arrangement 220 in an open state, where the connection frame 254 is in an open position, so that the second bus bars 238 and 239 are neither conductively coupled to the connection bus bar 144, nor to the secondary connection bus bars 258 and 260. Accordingly, in the open position of the connection frame 254, the second bus bars 238 and 239 are electrically isolated from the fixed bus bars 128 and 129 and simultaneously the second bus bars 238 and 239 are electrically isolated from each other, so that an electrical connection between the terminals 106 and 112 of the contactor device 100 is interrupted.

It is clear for the skilled person, that in the open position of the connection frame 254, it is also necessary to interrupt the electrical connection between the terminal 506 at the high-potential side of the high voltage battery 500 and the high-potential side of high voltage bus 105, as well as to interrupt the electrical connection between the terminal 504 at the low-potential side of the high voltage battery 500 and the low-potential side of high voltage bus 105. Although not shown in FIG. 12, for this purpose the movable bus bars 126 and 127 of the contact arrangement may be moved into an open position, where the movable bus bars 126 and 127 are electrically isolated from the fixed bus bars 128 and 129. Alternatively, the contactor device 100 may be used in combination with a second contactor device (as for example shown in FIGS. 14 and 15 described later), and the second contactor device may be brought into a state, where current flow between the high voltage battery 500 and the high voltage bus 105 is interrupted.

Hence, by mounting the connection bus bar 144 and the secondary connection bus bars 258 and 260 to the connection frame 254, the second exemplary contact arrangement 220 of contactor 100 allows to distinguish between two additional states when the contactor device is in the closed state, namely the series connection state and the parallel connection state, wherein it is possible to change the state of the contactor device 100 by moving the connection frame with an actuator. Hereby the connection frame 254 may be moved by the same actuator as the moveable bus bars 126 and 127 for changing the state of the contactor device 100, or a dedicated actuator may be provided for individually moving the connection frame 254. Possible configurations for such actuators are described later on with respect to second exemplary contactor device 300 and FIGS. 16 to 24. Accordingly, the configuration of the second exemplarily contact arrangement 220 makes it possible to provide each of the connection bus bars 144, 258 and 260, and the two second bus bars 238, 239 as fixedly mounted bus bars and only move the connection frame 254 for changing the state of the contactor device 100.

Furthermore, as schematically shown in FIGS. 8, 10 and 12, the contactor device 100 may comprise a pyrotechnic actuator 280, which is configured to permanently interrupt current flow through the contactor device 100, when the pyrotechnic actuator 280 is triggered, as an additional safety mechanism of the contact arrangement 220. Of course, also in contact arrangement 120 a pyrotechnic actuator may be used. Possible implementations of the pyrotechnic actuator 280 and possible contact separation mechanisms being executed by triggering the pyrotechnic actuator 280, which can implemented in the contact arrangements 120 and 220 will be described later with respect to second exemplary contactor device 300 and FIGS. 16 to 24.

Figure 14:
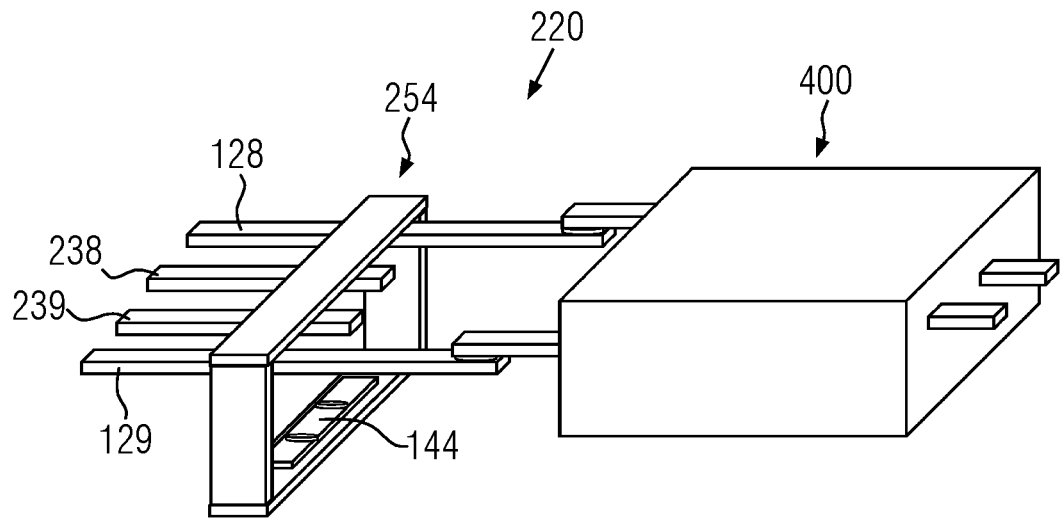
FIG. 14 shows another schematic perspective view of the second exemplary contact arrangement.
Figure 15:
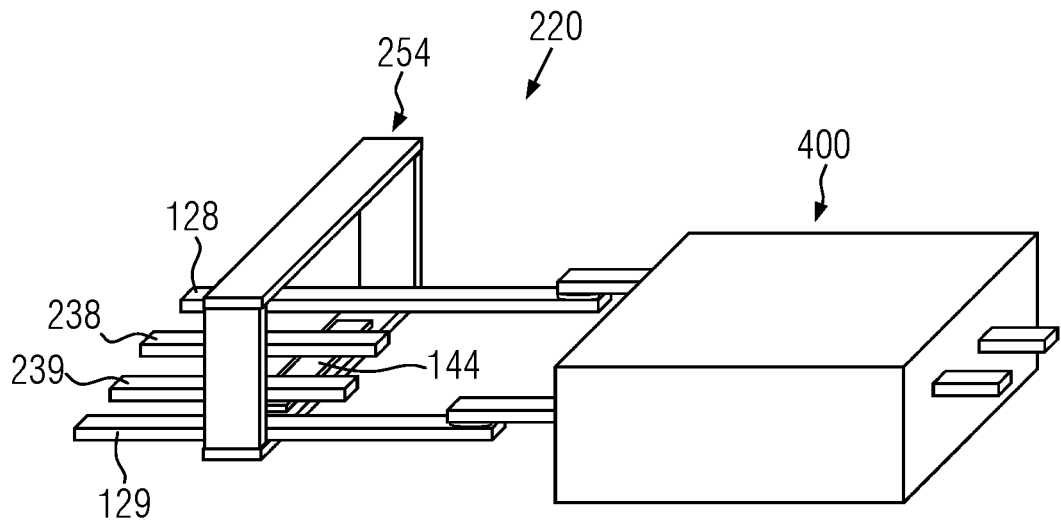
FIG. 15 shows another schematic perspective view of the second exemplary contact arrangement.

FIGS. 14 and 15 show the contact arrangement 220 conductively coupled to a second contactor device 400. Here, the contact arrangement 220 has the function of switching the connection state of the battery modules 502(1) and 502(2) of the battery 500 between the parallel connection state (FIG. 14) and the series connection state (FIG. 15). The second contactor device 400 can be any contactor device, which at least has the function of switching at least between an open state, in which current flow from the battery 500 to the high voltage bus 105 is prevented, and a closed state, in which current flow from the battery 500 to the high voltage bus 105 is possible. For example a contactor device as described in detail in European Patent application EP 20184037.8 can be used as the second contactor device 400.

Next, a second exemplary contactor device 300 is described with reference to FIGS. 16 to 24. Hereby, the elements of contactor device 300 and the elements of contactor device 100 having substantially the same functions are provided with similar reference numerals and the same or similar component designations. Contactor device 300 differs from the first exemplary contact arrangement 120 of the contactor device 100 in that the connection bus bar 144 and the two second bus bars 138, 139 are missing, and differs from the first exemplary contact arrangement 220 of the contactor device 100 in that the connection frame 254 the corresponding connection bus bars 144, 258 and 260, and the two second bus bars 238, 239 are missing.

Figure 16:
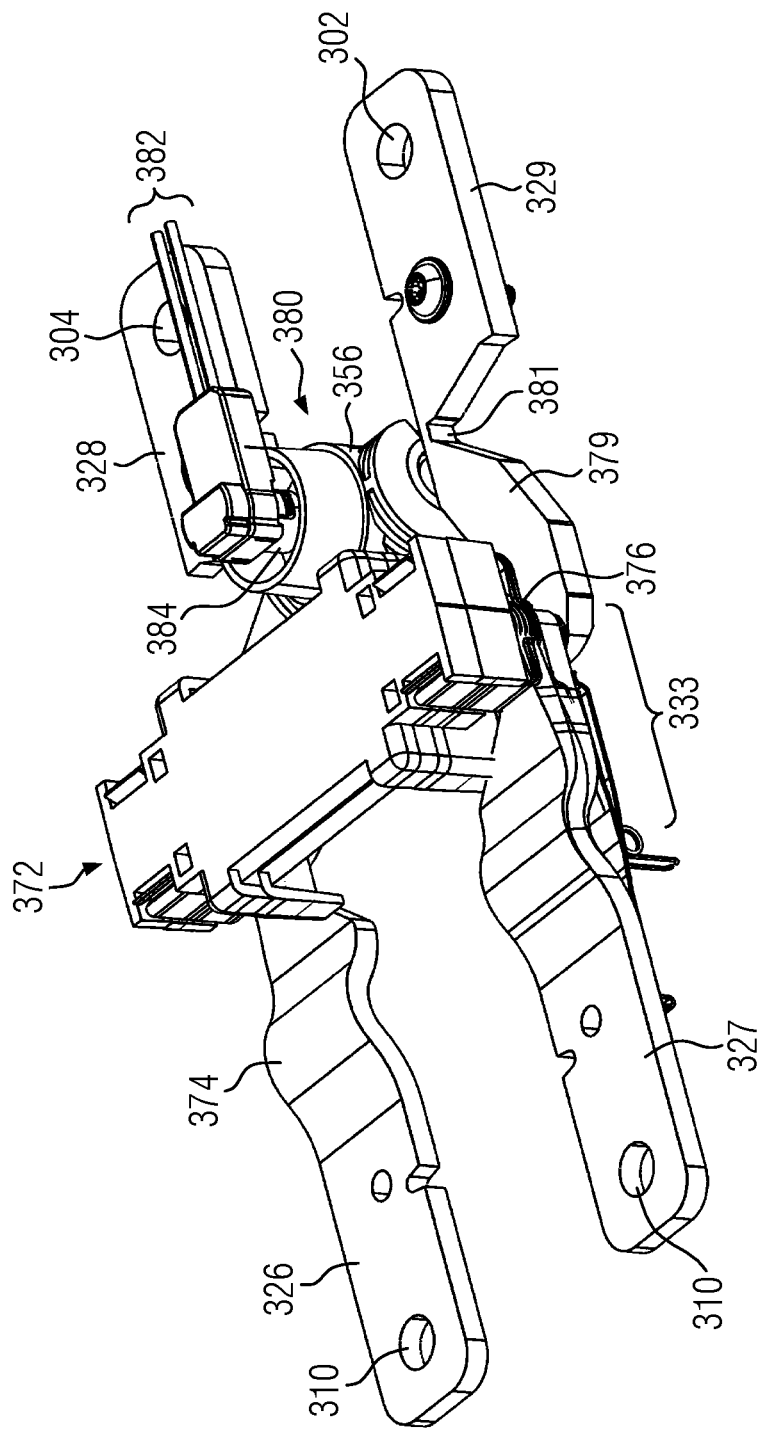
FIG. 16 shows a schematic perspective view of a second exemplary contactor device.

FIG. 16 shows a schematic perspective view of contactor device 300, which preferably comprises two fixed bus bars 328 and 329 and two moveable bus bars 326 and 327, so that the contactor device 300 can function as a 2 pole combination contactor, which under normal operating conditions functions as 2 pole single-break style contactor. However, the number of two moveable bus bars and two fixed bus bars is not essential for the functionality of contactor device 300, but contactor device 300 may have more than two moveable contacts and fixed contacts, or one moveable bus bar and one fixed bus bar. Fixed bus bars 328 and 329 and moveable bus bars 326 and 327 may form an exemplary implementation of the fixed bus bars 128, 129 and the moveable bus bars 126, 127 of the first contact arrangement 120 and of the second contact arrangement 220 respectively, where the remaining described parts can be added.

FIG. 16 shows the moveable bus bars 326 and 327 in a closed position, where each of the moveable bus bars 326 and 327 is conductively coupled to one of the fixed bus bars 328 and 329, so that a flow of electric current from the terminal 310, which is integrally formed with the moveable bus bar 326, to the terminal 304, which is integrally formed with the fixed bus bar 328, and from the terminal 308, which is integrally formed with the moveable bus bar 327, to the terminal 302, which is integrally formed with the fixed bus bar 329, is enabled. The terminals 308 and 310 may be electrically connected to the terminals 504 and 506 of high voltage battery 500, and the terminals 302 and 304 may be electrically connected to the high voltage bus 105, or vice versa. For reversibly connecting and disconnecting the current path through the contactor device 300, the contactor device 300 comprises an electromagnetic actuator 372, which is capable of reversibly moving the moveable bus bars 326 and 327 between the closed position and the open position.

In order to facilitate the reversible transition between the open position and the closed position, the moveable bus bars 326 and 327 are formed in such a way that they are able to deflect elastically between the open and closed position, at least in flexible contact regions 333. For this purpose, the moveable bus bars 326 and 327 may be formed of a multi-layer structure, which comprises, for example, 10 to 15 layers of copper or other suitable electrically conducting material. In addition, each of the moveable bus bars 326 and 327 may comprise a bulge 374, for supporting the deflection capability of the moveable bus bars 326 and 327. The bulge 374 may also contribute in applying a preload to the moveable bus bars 326 and 327, which pushes the moveable bus bars 326 and 327 towards the open position.

The electromagnetic actuator 372 is configured to hold the moveable bus bars 326 and 327 in the closed position, when being powered. For this purpose, each of the flexible contact regions 333 of the moveable bus bars 326 and 327 may be individually moved by the electromagnetic actuator 372, for example by means of a shaft 376, which is arranged on a top side of the moveable bus bars 326 and 327 in the flexible contact region 333. Additional spring elements may be arranged around the shaft 376, which help to absorb small dislocations or imbalances between the moveable bus bars 326 and 327 during operation of the contactor device 300, so as to prevent that such dislocations affect the electromagnetic actuator 372 or greatly impact the force applied between the fixed bus bars 328 and 329 and the moveable bus bars 326 and 327. Accordingly, tolerances between the fixed bus bars 328 and 329 and the moveable bus bars 326 and 327 introduced during fabrication of the contactor device 100 can be better compensated. Furthermore, a spring is situated below each of the moveable bus bars 326 and 327, i.e. on a bottom side of each of the moveable bus bars 326 and 327, which biases the moveable bus bars 326 and 327 to be in the open position, when no force is applied by the shafts 376, i.e. when the electromagnetic actuator 372 is not powered.

Figure 17:
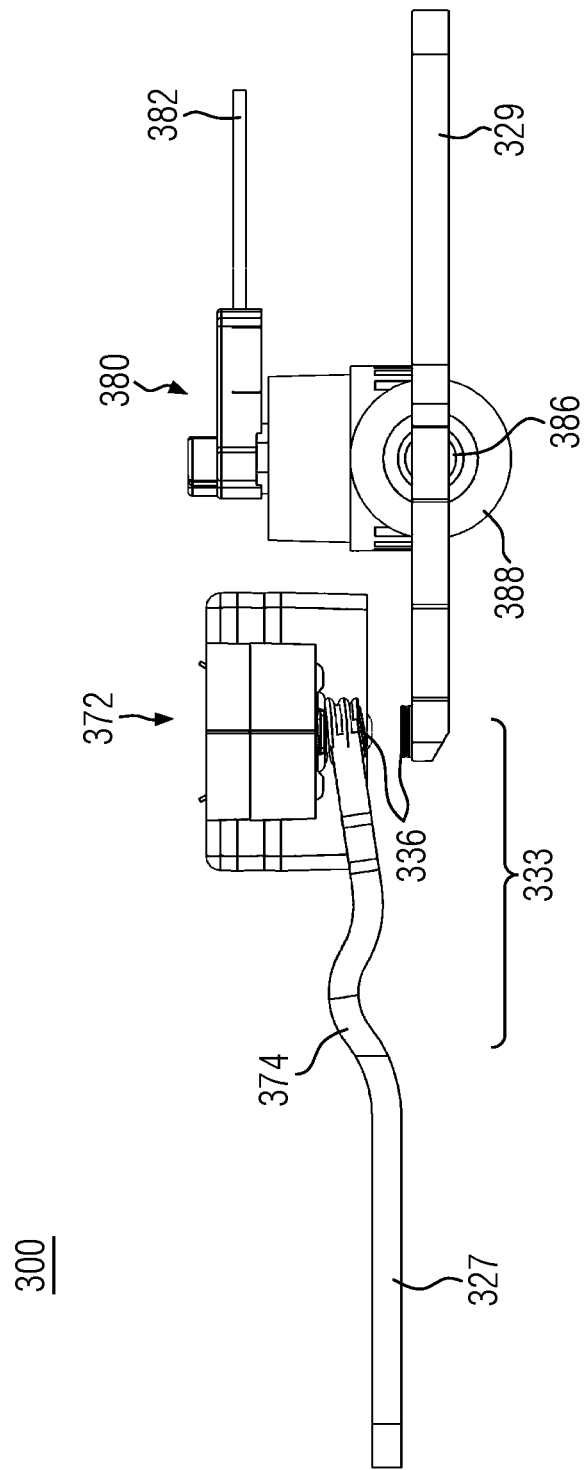
FIG. 17 shows a schematic side view of the second exemplary contactor device in the open position of the second exemplary contactor device.

FIG. 17 shows the contactor device 300 in an unpowered state, where the electromagnetic actuator 372 is not energized, so that the moveable bus bars 326 and 327 are simultaneously in the open position. Accordingly, contact elements 336 of the moveable bus bars 326 and 327 are electrically isolated from contact elements 336 of the fixed bus bars 328 and 329 by a spatial gap, so that current flow through the contactor device 300 is prevented. Due to the design of the moveable bus bars 326 and 327 sufficient electrical isolation between the moveable bus bars 326 and 327 and the fixed bus bars 328 and 329 can be provided even under normal atmosphere. Accordingly, the need for providing the moveable bus bars 326 and 327 and the fixed bus bars 328 and 329 in a sealed housing or for using an electronegative gas can be dispensed, so that the contactor device 300 can be remarkably simplified. However, it is also possible to provide at least a part of the moveable bus bars 326 and 327 and the fixed bus bars 328 and 329 in the region around the contact elements 336 in a sealed housing, in order to enhance the electrical isolation.

Figure 18:
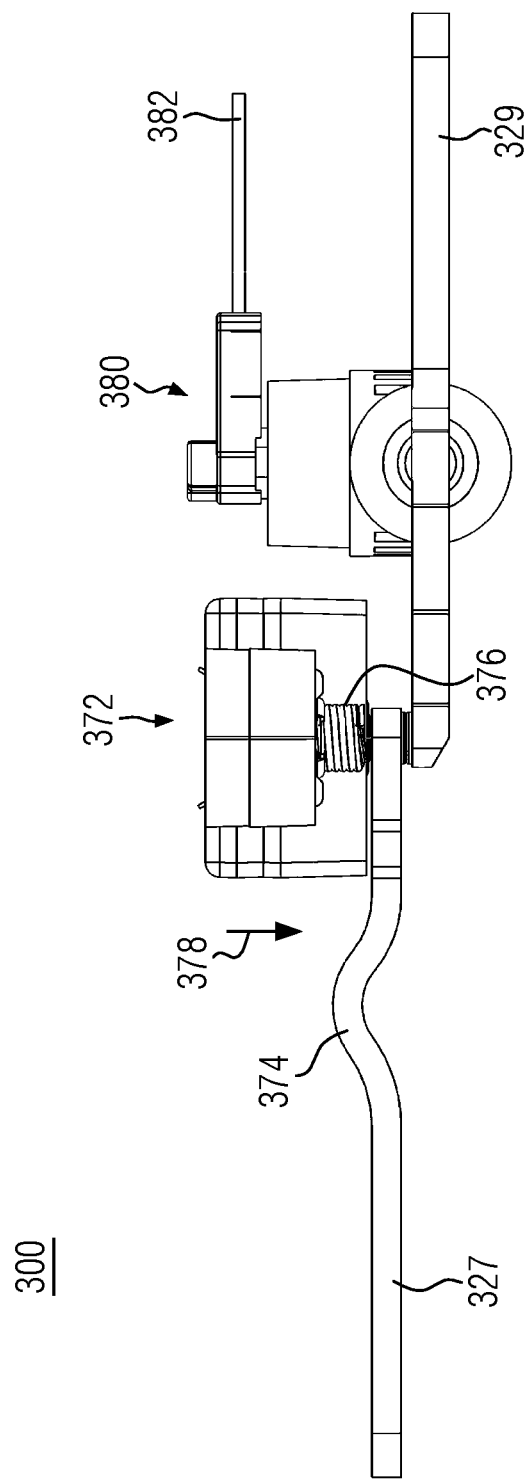
FIG. 18 shows a schematic side view of the second exemplary contactor device in the closed position of the second exemplary contactor device.

FIG. 18 shows the contactor device 300 in a powered state, where the moveable bus bars 326 and 327 are in the closed position, so that the contact points 336 of the moveable bus bars 326 and 327 are conductively coupled to the contact points 336 of the fixed bus bars 328 and 329.

For bringing the moveable bus bars 326 and 327 from the open position into the closed position, the armature of the electromagnetic actuator 372, applies a closing force to the moveable bus bars 326 and 327, for example through shafts 376, pushing the moveable bus bars 326 and 327 in a direction 378 of the closing force, i.e. in a direction towards the fixed bus bars 328 and 329.

Figure 19:
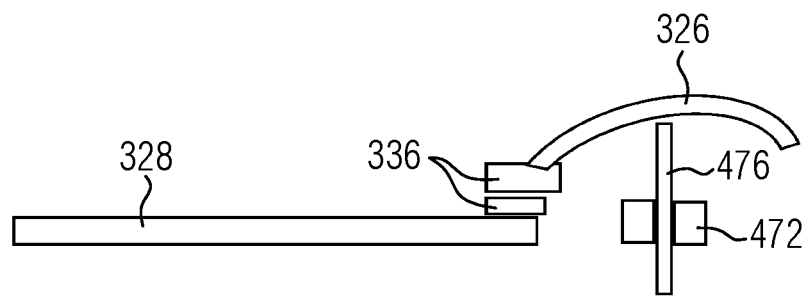
FIG. 19 shows a schematic side view of an exemplary actuation element.
Figure 20:
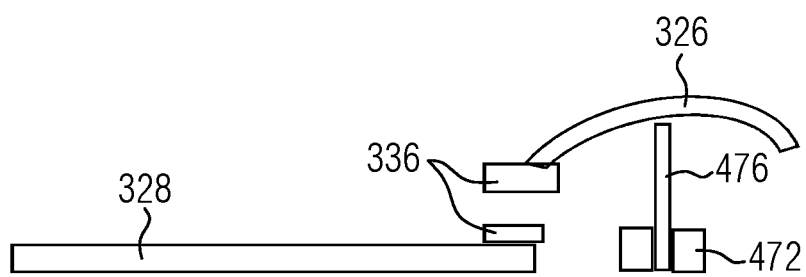
FIG. 20 shows another schematic side view of the exemplary actuation element.

Instead of electromagnetic actuator 372, for example contactor device 300 may be equipped with a linear motor actuator 472, which moves the moveable bus bars 326 and 327 between the open position (shown in FIG. 20) and the closed position (shown in FIG. 19), for example by driving a shaft 476 as schematically shown in FIGS. 19 and 20. Here, the shaft 476 is only moved, when the linear motor actuator 472 is powered. In this exemplary implementation, linear motor actuator 472 moves the moveable bus bars 326 and 327 only between the open position and the closed position, when the linear motor actuator 472 is powered, and the moveable bus bars 326 and 327 remain in the previous position, when the linear motor actuator 472 is not powered. Accordingly, linear motor actuator 472 functions as a bi-stable actuator, which allows to introduce the open state and the closed state of the contactor device 300 as bi-stable states of the contactor device 300, which are only changed, when the linear motor actuator 472 is powered.

Hence, different to the contactor device 300 with the electromagnetic actuator 372, which is brought to the open state, when the electromagnetic actuator 372 experiences a power loss, for example by a damage event, or due to a communication loss, the contactor device 300 can remain in the closed state (or open state) when the linear motor actuator 472 experiences a power loss, so that it is still possible to drive an electric vehicle after a power loss of the linear motor actuator 472.

Here, it should be noted that actuator 372 and/or actuator 472 can also be provided as actuators in first exemplary contact arrangement 120 as actuator(s) for moving the moveable bus bars 126 and 127 between the open position and the closed position and/or for moving the second bus bars 138 and 139 between the second bus bars 138, 139 between the series connection position and the parallel connection position. Similar, actuator 372 or actuator 472 can also be provided as actuators in second exemplary contact arrangement 220 as actuator(s), for moving the connection frame 254 in order to change the state of contactor device 100 and/or for moving the moveable bus bars 126 and 127 between the open position and the closed position.

Referring back to FIG. 16, it is shown that the contactor device 300 further comprises a pyrotechnic actuator 380, which is configured to permanently displace the fixed bus bars 328 and 329 into a fired position, where the fixed bus bars 328 and 329 are permanently electrically isolated from the moveable bus bars 326 and 327 when being triggered. Thereby, displacing the fixed bus bars 328 and 329 can refer to displacing the fixed bus bars 328 and 329 as a whole, or can refer to displacing the fixed bus bars 328 and 329 at least in a contact region 379 of fixed bus bars 328 and 329, which includes contact elements 336, for example by irreversibly severing the fixed bus bars 328 and 329 as described later. In this manner, it can be prevented that the moveable bus bars 326 and 327 are still capable of conductively coupling to the fixed bus bars 328 and 329 after activation of the pyrotechnic actuator 380. Consequently, current flow through the contactor device 300 can be interrupted permanently by the activation of the pyrotechnic actuator 380.

The pyrotechnic actuator 380 can comprise two or more pyrotechnic electrical terminals 382, sometimes also signified as pyrotechnic pins, which cause ignition of a pyrotechnic charge, in response to the reception of an electric control signal. The pyrotechnic charge may be an explosive, which is directly ignited by the electric control signal or may be a gas generator charge, which suddenly expands after reception of the electric control signal. Alternatively, the pyrotechnic charge may have a multiple charge structure, comprising for example an initiator charge and a secondary gas generator charge.

The pyrotechnic electrical terminals 382 may for example be connected to a current sensing controller integrated in the contactor device 300, which is configured to detect the current flowing through the contactor device 300 in the closed position. When the detected current exceeds a predetermined threshold, which may be represented by a level of current, which is dangerous for the functioning of the contactor device 300, the current sensing controller may transmit the electronic control signal to ignite the pyrotechnic charge.

Alternatively, the pyrotechnic electrical terminals 382 may be connected to an external controller or to a controller of high voltage battery 500, like a battery management system of high voltage battery 500, which may provide an electric control signal for triggering the pyrotechnic actuator 380, for example in response to the detection of an overcurrent or a malfunction in energy storage system 10. The electric control signal may also be received in response to a detected anomaly or a malfunction in any other circuit component of an electric circuit to which the contactor device 300 is conductively coupled. As another alternative, the pyrotechnic electrical terminals 382 may be connected to an electronic control unit (ECU) or a crash sensor of a vehicle, which comprises the contactor device 300, and may receive the electronic control signal in response to the detection of an accident of the vehicle.

The pyrotechnic actuator 380 further comprises a piston structure 384, which can be driven away from its resting position by the force, which is generated when the pyrotechnic charge is ignited. Propelled by the generated force, the piston structure 384 drives displacement elements 386, which are supported in an actuator housing 388 of pyrotechnic actuator 380, to push fixed bus bars 328 and 329 simultaneously into the fired position away from moveable bus bars 326 and 327. For example, studs or bolts, which are driven by the energy of the piston structure 384 to displace or server the fixed bus bars 328 and 329 may serve as the displacement elements 386.

As further shown in FIG. 16, each of the fixed bus bars 328 and 329 may comprise a hinge flexure 381, which may be provided between the terminal 302 and the contact element 336 of the fixed bus bar 329 and between the terminal 304 and the contact element 336 of the fixed bus bar 328. The hinge flexure 381 allows the contact region 379 of the fixed bus bars 328 and 329 to swing away from the moveable bus bars 326 and 327 in a well-defined manner, when pyrotechnic actuator 380 is triggered. Accordingly, each of the hinge flexures 381 of the fixed bus bars 328 and 329 provides an axis of mechanical motion, around which the respective fixed bus bars 328 and 329 rotates during movement into the fired position. Hereby, a position of the hinge flexure 381 of the fixed bus bars 328 and 329 may be adjusted in order to change the swinging radius of the contact region 381 of the fixed bus bars 328 and 329. Hence, a movement path of the fixed bus bars 328 and 329 or at least of the contact region 379 of the fixed bus bars 328 and 329 from the regular position into the fired position can be well defined.

The actuator housing 388 may further provide an accommodation for the piston structure 384, when the piston structure 384 is in the resting position, before the pyrotechnic actuator 380 is triggered. The actuator housing 388 may also provide piston stopping means, for stopping the piston structure 380, when the piston structure 380 reaches an end position and the fixed bus bars 328 and 329 are in the fired position. In this manner, the contactor device 300 can provide a well-defined path for the piston structure 384. The actuator housing 388 may also provide retaining means for retaining the piston structure 384 in the end position, so as to prevent that the piston structure 384 may move back into the resting position after the pyrotechnic actuator is triggered. In this manner, the piston structure 384 can help to hold the fixed bus bars 328 and 329 in the fired position, when the pyrotechnic actuator is activated. Additionally or alternatively, the actuator housing 388 may also provide retaining means for retaining the fixed bus bars 328 and 329 in the fired position.

The contactor device 300 may also comprise arc suppressing elements, in order to extinguish an arc, which may be generated by the rapid break of the current carrying path, when the pyrotechnic actuator 380 is activated. For example, the contactor device 300 may comprise one or more arc blowout magnets, which are used to control the development of arcing, or may comprise an array of arc splitting plates, which are configured for splitting and cooling the arc into multiple individual arcs having lower energy. Alternatively, the arc suppressing elements may comprise mechanical devices, which may be inserted between the fixed bus bars 328 and 329 and the moveable bus bars 326 and 327, when the pyrotechnic actuator 380 is activated. Alternatively or additionally, the arc suppressing elements may also comprise a gas generator charge, which is ignited when the pyrotechnic actuator 380 is activated, in order to generate a gas that cools the arc or mixes the arc with air.

Figure 21:
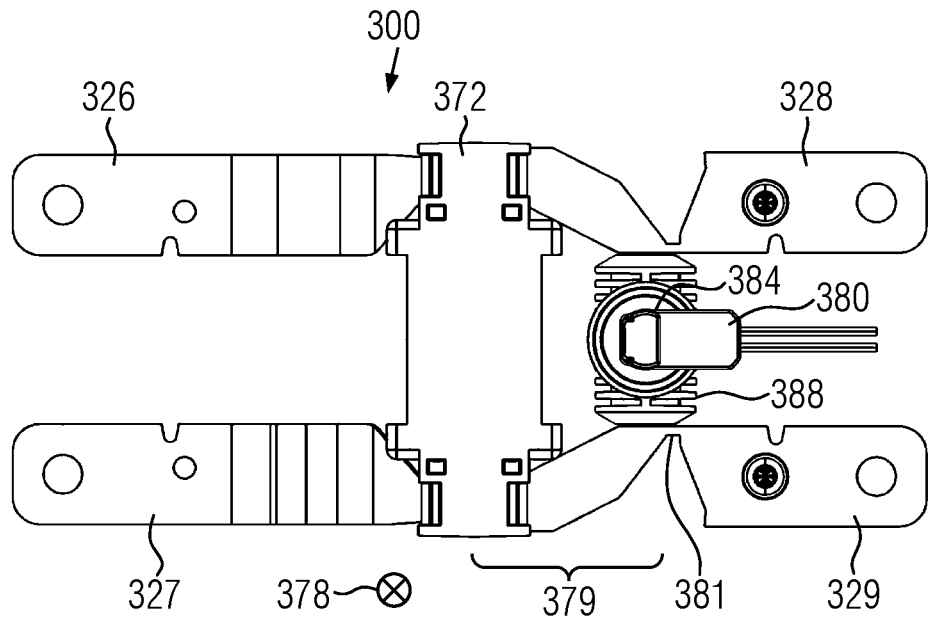
FIG. 21 shows a schematic top view of the second exemplary contactor device.

The operation of the pyrotechnic actuator 380 will in the following be explained with respect to FIGS. 21 and 22, which show a schematic top view of contactor device 300. FIG. 21 shows the contactor device 300 in the closed position of the moveable bus bars 326 and 327 and in a state before the pyrotechnic actuator 380 is activated. A holding force, which points in direction 378, i.e. in a direction from the contact elements 336 of the moveable bus bars 326 and 327 towards the contact elements 336 of the fixed bus bars 328 and 329, holds the moveable bus bars 326 and 327 in the closed position. As indicated by cross 378 the holding force is pointing into the paper level in the example of FIGS. 21 and 22.

Figure 22:
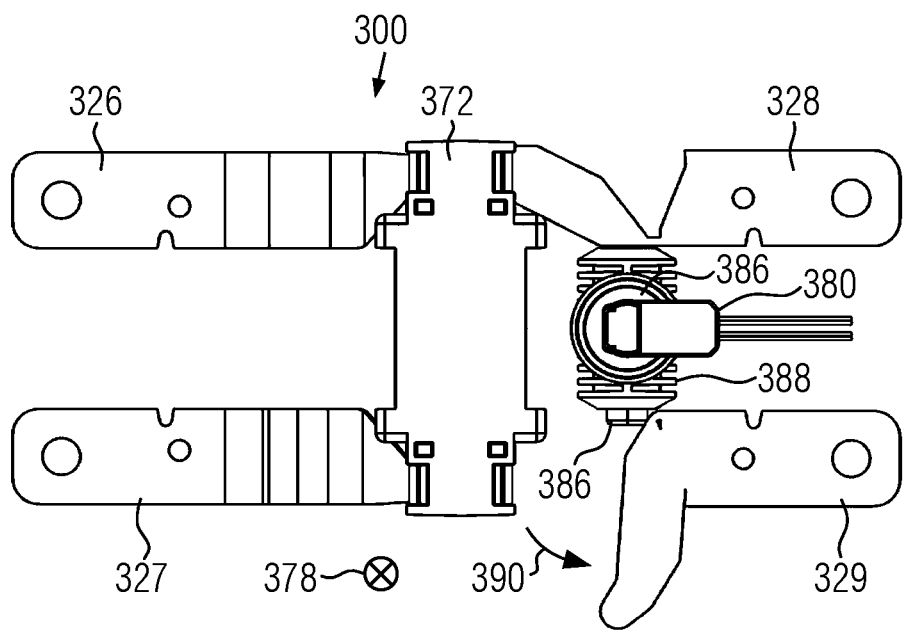
FIG. 22 shows another schematic top view of the second exemplary contactor device.

FIG. 22 shows a top view of the of the contactor device 100 in a state where the pyrotechnic actuator 380 has been triggered. While in FIG. 22, only fixed bus bar 329 is illustrated to be in the fired position, also fixed bus bar 328 is simultaneously moved into the fired position after triggering the pyrotechnic actuator 380. The piston structure 384 is driven away from its resting position by the force, which is generated when the pyrotechnic charge is ignited. The generated force drives the displacement elements to irreversibly move the fixed bus bars 328 and 329 into the fired position, where the fixed bus bars 328 and 329 are electrically isolated from the moveable bus bars 326 and 327. As indicated arrow 390, the movement of the fixed bus bars 328 and 329 or the contact region 379 of the fixed bus bars 328 and 329 preferably happens in a plane, which is perpendicular to the direction 378 of the holding force applied to the moveable bus bars 326 and 327 by the electromagnetic actuator 372.

However, it is not essential that the plane, in which the fixed bus bars 328 and 329 or the contact region 379 of the fixed bus bars 328 and 329 move into the fired position is perpendicular to the direction 378 of the holding force, but this plane may only enclose a predetermined angle with the direction 378, so that the direction of movement of the fixed bus bars 328 and 329 or the contact region 379 of the fixed bus bars 328 and 329 at least comprises an angle with respect to the movement direction of the moveable bus bars 326 and 327 between the open position and the closed position.

In this manner, it can be ensured that the fixed bus bars 328 and 329 can be moved into the fired position, without affecting the actuation mechanism for moving and holding the moveable bus bars 326 and 327 in the closed position. Similarly, it is prevented that the motion of the fixed bus bars 328 and 329 into the fired position is affected by the actuation mechanism for moving and holding the moveable bus bars 326 and 327 in the closed position, as the force generated by the pyrotechnic actuator 380 is transmitted in such a way to the fixed bus bars 328 and 329 that it does not work against the forces generated by electromagnetic actuator 372 (or the linear motor actuator 472).

It should be noted that the movement of the fixed bus bars 328 and 329 or the contact region 379 of the fixed bus bars 328 and 329 into the fired position is not restricted to a rotational movement, but the fixed bus bars 328 and 329 or the contact region 379 of the fixed bus bars 328 and 329 may for example also be moved linearly into the fired position, on a movement path, which is independent from the movement path of the moveable bus bars 326 and 327 between the open position and the closed position.

Accordingly, contactor device 300, enables to reversibly move the moveable bus bars 326 and 327 between the open position and the closed position by controlling the operation of the electromagnetic actuator 372 (or the linear motor actuator 472). Further, when the pyrotechnic actuator 380 is activated, the fixed bus bars 328 and 329 are moved into the fired position, thus permanently displacing or severing the fixed bus bars 328 and 329 in order to permanently interrupt the current flow through the contactor device 300. In other words, while the electromagnetic actuator 372 (or the linear motor actuator 472) is configured to reversibly move and hold the moveable bus bars 326 and 327, in order to reversibly change the conduction state of the contactor device 300, the pyrotechnic actuator 380 is configured to irreversibly move the fixed bus bars 328 and 329 into the fired position, in order to irreversibly break the current flow through the contactor device 300. Remarkably, activation of the pyrotechnic actuator is possible independent of the position of the moveable bus bars 326 and 327 and the electromagnetic actuator 372 (or the linear motor actuator 472).

Figure 23:
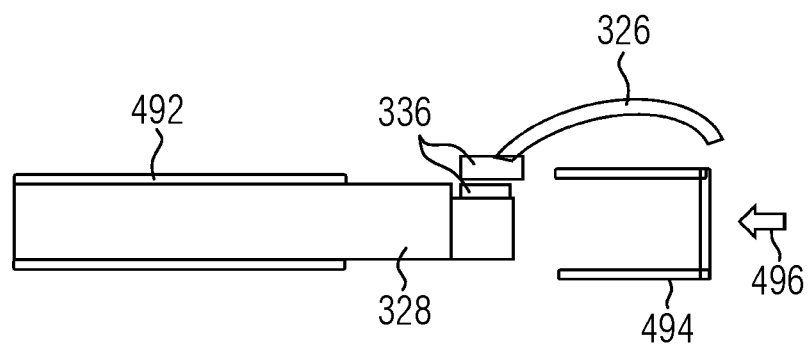
FIG. 23 shows a cross section of an exemplary isolation element.
Figure 24:
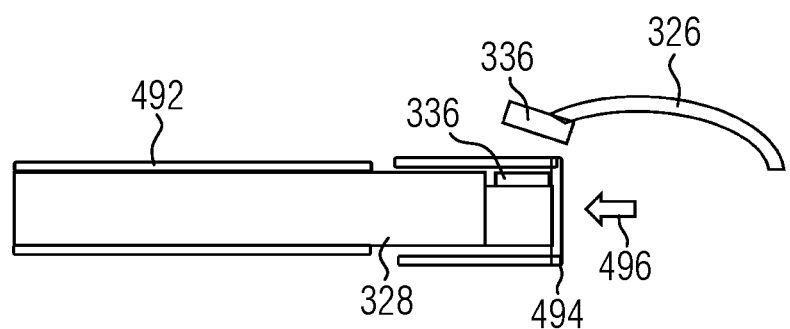
FIG. 24 shows another schematic cross section of the exemplary isolation element.

Instead of mechanically moving the fixed bus bars 328 and 329 into the fired positon, FIGS. 23 and 24 schematically show an alternative contact separation mechanism which may be implemented in contactor device 300. This mechanism is exemplarily shown for irreversibly separating fixed bus bar 328 and moveable bus bar 326, but of course, the same separation mechanism may also be provided for irreversibly separating fixed bus bars 329 and moveable bus bar 327. Here, the fixed bus bars 328 preferably has a cylindrical cross-section, and is at least partly surrounded by an electric isolation layer 492 formed of an electrically insulating material.

For irreversibly separating the fixed bus bar 328 from the moveable bus bar 326, the piston structure of the pyrotechnic actuator, instead of driving a displacement element 386 to move the fixed bus bar 328, here is configured to moves an isolation cap 494, which is formed of electrically insulating material, from a regular position (FIG. 23) into a fired position (FIG. 24), after the pyrotechnic actuator has been triggered.

As shown in FIG. 23, as long as the isolation cap 494 is in the regular position, i.e. before triggering the pyrotechnic actuator, the contact elements 336 of the moveable bus bar 326 and of the fixed bus bar 328 can be conductively coupled to enable current flow through the contactor device 300, and the moveable bus bar 326 may be moved between the open position and the closed position. Upon triggering of the pyrotechnic actuator, however, the pyrotechnic piston drives the isolation cap 494 in direction of the fixed bus bar 328 (indicated in FIGS. 23 and 24 by arrow 496) until in the fired position the isolation cap 494 completely encompasses an end region of the fixed bus bar 328. Consequently, in the fired position the isolation cap 494 is pushed between the contact elements 336 of the moveable bus bar 326 and of the fixed bus bar 328, and accordingly electrically isolates the moveable bus bar 326 and the fixed bus bar 328 from each other.

In this manner, the isolation cap 494 can interrupt the current flow through the moveable bus bar 326 and the fixed bus bar 328 and at the same time suppress the formation of electric arcs. For this purpose, preferably the isolation cap 494 completely encompasses the end region of the fixed bus bar 328, which includes the contact element 336, and may overlap with electric isolation layer 492. However, the complete encapsulation of the end region is not essential for the alternative contact separation mechanism, as long as isolation cap provides sufficient electric isolation between the moveable bus bar 326 and the fixed bus bar 328.

Despite not being shown in the Figures, it is possible to add the two second bus bars 138 and 139 and the connection bus bar 144 to the contact arrangement of the contactor device 300, in order to form the first exemplary contact arrangement 120 shown in FIGS. 2 to 7. Similar, it is also possible to add the two second bus bars 238 and 239 and the connection frame 254 with the corresponding connection bus bars 144, 258 and 260 to the contact arrangement of the contactor device 300, in order to form the second exemplary contact arrangement 220 shown in FIGS. 8 to 13. In other words, the contactor device 300 or single components of the contactor device 300 may form a basis for building the contactor device 100, to which the additional components of the first exemplary contact arrangement 120 or the second exemplary contact arrangement 220 are added. Hereby, it is for example possible that the two second bus bars 138 and 139 may be formed in analogy to the moveable bus bars 326 and 327 of the contactor device 300.

The present disclosure also relates to an energy storage system 10, which comprises the contactor device 100 or the contactor device 300. The energy storage system 10 may for example be an energy storage apparatus, which comprises the contactor device 100 or the contactor device 300 and battery 500. The energy storage system 10 may further comprise a controller or battery management system, which controls the operation of the battery 500 and of the contactor device 100 or the contactor device 300 and may monitor the operation conditions of the energy storage system 10. For example, the controller or battery management system may control the at least one actuator of the contactor device 100 to change a state of the contactor device 100 at least to and from a series connection state and to and from a parallel connection state, and/or to and from the closed state and to and from the open state in response to control signals provided by the controller or battery management system. Similar the controller or battery management system may control the at least one actuator of the contactor device 300 to change a state of the contactor device at least to and from the closed state and to and from the open state in response to control signals provided by the controller or battery management system. Furthermore, in case that an operation outside the safe operation conditions (unsafe operation conditions), like an overcurrent, an overheating of battery 500 or an accident, the controller or battery management system may trigger the pyrotechnic actuator 380 (or 280) of contactor device 300 (or contactor 100) by providing a respective control signal.

REFERENCE NUMERALS

| | |
|---|---|
| 10 | Energy storage system |
| 100, 300 | Contactor device |
| 102, 104, 106, 108, 110, 112, 302, 304, 308, 310 | Terminals of the contactor device |
| 105 | High voltage bus |
| 120, 220 | Contact arrangement |
| 122, 124 | Contacts |
| 126, 127, 326, 327 | Moveable bus bars (third bus bars) |
| 128, 129, 328, 329 | Fixed bus bars (first bus bars) |
| 130, 131 | Rigid region of moveable bus bar |
| 132, 133, 333 | Flexible region of moveable bus bar |
| 134 | First contact points |
| 136, 148, 152, 248, 252, 270, 336 | Contact element |
| 138, 139, 238, 239 | Second bus bar |
| 140, 141 | Rigid region of second bus bar |
| 142, 143 | Flexible region of second bus bar |
| 144 | (Primary) connection bus bar |
| 146, 246 | Second contact point |
| 150, 250 | Third contact point |
| 254 | Connection frame |
| 256 | Base plate |
| 258, 260 | Secondary connection bus bar |
| 262 | Cover plate |
| 264, 266 | Side plate |
| 268 | Fourth contact point |
| 280, 380 | Pyrotechnic actuator |
| 372 | Electromagnetic actuator |
| 374 | Bulge |
| 376 | Shaft |
| 378 | Direction of closing force |
| 379 | Contact region of fixed bus bars |
| 381 | Hinge flexure |
| 382 | Pyrotechnic electrical terminals |
| 384 | Piston structure |
| 386 | Displacement element |
| 388 | Actuator housing |
| 390, 496 | Arrow |
| 472 | Linear motor actuator |
| 492 | electric isolation layer |
| 494 | Isolation cap |

The invention claimed is:

1. A contactor device comprising:
two first terminals for electrically connecting at least one of a load and a charger;
two second terminals for electrically connecting a first battery module;
two third terminals for electrically connecting a second battery module;
two first bus bars, which each are electrically connected to one of the first terminals;
two second bus bars, wherein one of the second bus bars is electrically connected to one of the second terminals, and the other one of the second bus bars is electrically connected to one of the third terminals;
a connection bus bar, which is electrically isolated from the two first bus bars; and
at least one actuation element, which is configured to change a state of the contactor device at least to and from a series connection state, in which the two second bus bars are conductively coupled to the connection bus bar, and to and from a parallel connection state, in which one of the second bus bars is conductively coupled to one of the first bus bars and the other one of the second bus bars is conductively coupled to the other one of the first bus bars.

2. The contactor device according to claim 1, wherein each of the second bus bars comprises a deflectable contact region, which is capable of elastically deflecting between a first position, in which each of the second bus bars is conductively coupled to the connection bus bar and a second position, in which each of the second bus bars is conductively coupled to one of the first bus bars.

3. The contactor device according to claim 1, further comprising two secondary connection bus bars, which each are configured to conductively couple one of the second bus bars to respectively one of the first bus bars in the parallel connection state of the contactor device.

4. The contactor device according to claim 3, wherein the connection bus bar and the secondary connection bus bars are mounted to a connection frame, and wherein the at least one actuation element is configured to move the connection frame for changing the state of the contactor device to and from the series connection state and to and from the parallel connection state.

5. The contactor device according to claim 1, wherein each of the second bus bars comprises a plurality of contact elements arranged at different sides of the second bus bars, and wherein each of the second bus bars is configured to be conductively coupled to the connection bus bar at a contact side of the second bus bar different from a contact side for conductively coupling to one of the first bus bars.

6. The contactor device according to claim 1, wherein the at least one actuation element comprises a dedicated actuator for changing the state of the contactor device to and from the series connection state and to and from the parallel connection state.

7. The contactor device according to claim 1, further comprising two third bus bars, wherein one of the third bus bars is electrically connected to the other one of the second terminals, and the other one of the third bus bars is electrically connected to the other one of the third terminals; and
wherein the at least one actuation element is configured to change a state of the contactor device to and from a closed state, in which each of the third bus bars is conductively coupled to respectively one of the first bus bars and to and from an open state, in which the two third bus bars and the two second bus bars are electrically isolated from the two first bus bars.

8. The contactor device according to claim 7, wherein each of the third bus bars comprises a deflectable contact region, which is capable of elastically deflecting between an open position, in which each of the third bus bars is electrically isolated from the two first bus bars and a closed position, in which each of the two third bus bars is conductively coupled to respectively one of the first bus bars.

9. The contactor device according to claim 7, wherein the contactor device is in the open state, when the at least one actuation element is not powered.

10. The contactor device according to claim 1, wherein a state of the contactor device is only changed, when the at least one actuation element is powered.

11. The contactor device according to claim 1, further comprising at least one pyrotechnic actuator, which, upon activation, is configured to irreversibly prevent current flow through each of the first bus bars.

12. The contactor device according to claim 7, further comprising at least one pyrotechnic actuator, which, upon activation, is configured to move the two first bus bars into a fired position, wherein in the fired position, each of the two first bus bars is irreversibly displaced or severed.

13. The contactor device according to claim 7, further comprising at least one pyrotechnic actuator, which, upon activation, is configured to irreversibly drive at least one isolation element into a fired position, wherein in the fired position, the isolation element electrically isolates the two third bus bars and the two first bus bars from each other.

14. The contactor device according to claim 13, wherein the isolation element comprises at least two isolation caps, wherein in the fired position each of the at least two isolation caps completely encompasses a contact region of respectively one of the first bus bars.

15. An energy storage system, which comprises:
a battery formed of at least a first battery module and a second battery module; and
the contactor device according to claim 1;
wherein the first battery module is electrically connected to the two second terminals of the contactor device, and the second battery module is electrically connected to the third terminals of the contactor device.

\* \* \* \* \*